US009593242B2

(12) United States Patent
Powell et al.

(10) Patent No.: US 9,593,242 B2
(45) Date of Patent: *Mar. 14, 2017

(54) METHODS AND SYSTEMS FOR DISTRIBUTING A SLURRY CATALYST IN CELLULOSIC BIOMASS SOLIDS

(71) Applicant: SHELL OIL COMPANY, Houston, TX (US)

(72) Inventors: Joseph Broun Powell, Houston, TX (US); Glenn Charles Komplin, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/067,309

(22) Filed: Oct. 30, 2013

(65) Prior Publication Data
US 2014/0117276 A1 May 1, 2014

Related U.S. Application Data

(60) Provisional application No. 61/720,757, filed on Oct. 31, 2012.

(51) Int. Cl.
D21C 3/20 (2006.01)
C08L 97/00 (2006.01)
(Continued)

(52) U.S. Cl.
CPC .............. C08L 97/005 (2013.01); C08H 6/00 (2013.01); C08H 8/00 (2013.01); C08L 97/02 (2013.01);
(Continued)

(58) Field of Classification Search
CPC ....................................................... D21C 3/20
See application file for complete search history.

(56) References Cited

U.S. PATENT DOCUMENTS 3,882,015 A * 5/1975 Carson .......................... 208/169
4,017,642 A * 4/1977 Orth et al. ...................... 426/69
(Continued)

FOREIGN PATENT DOCUMENTS

CN 102676198 3/2015
EP 2182047 5/2010
(Continued)

OTHER PUBLICATIONS

Luo, Chen et al., Luo, Chen et al., Cellulose Conversion into Polyols Catalyzed by Reversibly Formed Acids.
(Continued)

Primary Examiner — Liam J Heincer

(57) ABSTRACT

Digestion of cellulosic biomass solids may be complicated by release of lignin therefrom. Methods for digesting cellulosic biomass solids may comprise: heating cellulosic biomass solids and a digestion solvent in the presence of molecular hydrogen and a slurry catalyst capable of activating molecular hydrogen, thereby forming a phenolics liquid phase comprising lignin, an aqueous phase comprising an alcoholic component derived from the cellulosic biomass solids, and an optional light organics phase, the slurry catalyst being distributed in the cellulosic biomass solids and at least a portion of the slurry catalyst accumulating in the phenolics liquid phase as it forms; conveying at least a portion of the phenolics liquid phase and the slurry catalyst to a location above at least a portion of the cellulosic biomass solids; and after conveying the phenolics liquid phase and the slurry catalyst, releasing them such that they come in contact with the cellulosic biomass solids.

38 Claims, 3 Drawing Sheets

(51) Int. Cl.

| | | |
|---|---|---|
| *C08H 7/00* | (2011.01) | |
| *C08H 8/00* | (2010.01) | |
| *C10G 1/00* | (2006.01) | |
| *C10G 1/06* | (2006.01) | |
| *C10G 1/08* | (2006.01) | |
| *C10G 3/00* | (2006.01) | |
| *D21C 3/22* | (2006.01) | |
| *D21C 7/14* | (2006.01) | |
| *C08L 97/02* | (2006.01) | |

(52) U.S. Cl.
CPC ............ *C10G 1/002* (2013.01); *C10G 1/065* (2013.01); *C10G 1/083* (2013.01); *C10G 3/42* (2013.01); *C10G 3/50* (2013.01); *D21C 3/222* (2013.01); *D21C 7/14* (2013.01); C10G 2300/1014 (2013.01); C10G 2300/4081 (2013.01); C10G 2400/02 (2013.01); C10G 2400/04 (2013.01); C10G 2400/06 (2013.01); C10G 2400/20 (2013.01); C10G 2400/22 (2013.01); Y02E 50/343 (2013.01); Y02P 30/20 (2015.11)

(56) References Cited

U.S. PATENT DOCUMENTS

| | | | | |
|---|---|---|---|---|
| 4,105,467 | A * | 8/1978 | Buckl et al. .................. | 127/37 |
| 4,259,294 | A * | 3/1981 | Van Zijll Langhout et al. ............ | 422/608 |
| 4,536,584 | A * | 8/1985 | Eskamani et al. ............ | 549/429 |
| 4,968,409 | A * | 11/1990 | Smith .......................... | 208/157 |
| 5,916,529 | A * | 6/1999 | Scheuerman ................. | 422/141 |
| 6,030,915 | A | 2/2000 | de Boer | |
| 6,086,749 | A * | 7/2000 | Kramer et al. ............... | 208/213 |
| 6,127,229 | A | 10/2000 | Chu et al. | |
| 8,262,905 | B2 | 9/2012 | Gabrielov | |
| 8,263,792 | B2 * | 9/2012 | Robinson ...................... | 549/483 |
| 9,181,158 | B2 | 11/2015 | Powell et al. | |
| 2008/0025903 | A1 * | 1/2008 | Cortright .................... | 423/437.1 |
| 2008/0058563 | A1 * | 3/2008 | Dumesic et al. ............. | 585/240 |
| 2008/0312479 | A1 * | 12/2008 | McCall et al. ................ | 585/240 |
| 2009/0326286 | A1 * | 12/2009 | Yie et al. ...................... | 585/240 |
| 2010/0236988 | A1 | 9/2010 | Gabrielov et al. | |
| 2011/0094149 | A1 * | 4/2011 | Weiss et al. ................... | 44/308 |
| 2011/0154722 | A1 * | 6/2011 | Chheda et al. ................ | 44/307 |
| 2011/0167713 | A1 * | 7/2011 | Quignard et al. ............. | 44/307 |
| 2011/0245444 | A1 * | 10/2011 | Miller et al. ................... | 526/346 |
| 2011/0312050 | A1 | 12/2011 | Zhang et al. | |
| 2011/0313208 | A1 * | 12/2011 | Kalnes et al. ................ | 568/852 |
| 2011/0313212 | A1 * | 12/2011 | Kalnes et al. ................ | 568/913 |
| 2012/0151827 | A1 | 6/2012 | Powell et al. | |
| 2012/0152836 | A1 | 6/2012 | Powell et al. | |
| 2012/0156742 | A1 | 6/2012 | Powell et al. | |
| 2012/0157730 | A1 * | 6/2012 | Powell et al. ................ | 585/242 |
| 2012/0167875 | A1 * | 7/2012 | Qiao et al. .................... | 127/36 |
| 2012/0167876 | A1 | 7/2012 | Qiao et al. | |
| 2012/0172579 | A1 * | 7/2012 | Qiao et al. .................... | 530/500 |
| 2012/0198760 | A1 * | 8/2012 | Blommel et al. ............. | 44/437 |
| 2012/0317872 | A1 | 12/2012 | Powell et al. | |
| 2012/0317873 | A1 * | 12/2012 | Johnson et al. .............. | 44/307 |
| 2012/0318258 | A1 * | 12/2012 | Qiao et al. .................... | 127/36 |
| 2012/0323051 | A1 * | 12/2012 | Powell .......................... | 568/913 |
| 2013/0030230 | A1 * | 1/2013 | Brandvold et al. ........... | 585/242 |
| 2013/0059354 | A1 * | 3/2013 | Borresen et al. ............. | 435/160 |
| 2013/0109896 | A1 | 5/2013 | Powell et al. | |
| 2013/0152456 | A1 * | 6/2013 | Powell .......................... | 44/307 |
| 2013/0152457 | A1 | 6/2013 | Powell et al. | |
| 2013/0152458 | A1 | 6/2013 | Powell et al. | |
| 2013/0158308 | A1 * | 6/2013 | Powell .......................... | 585/240 |
| 2013/0165698 | A1 * | 6/2013 | Powell .......................... | 568/863 |
| 2013/0232853 | A1 * | 9/2013 | Peterson et al. .............. | 44/307 |
| 2013/0305594 | A1 * | 11/2013 | Shuai et al. ................... | 44/330 |
| 2014/0000153 | A1 * | 1/2014 | Powell .......................... | 44/307 |
| 2014/0000154 | A1 * | 1/2014 | Powell .......................... | 44/307 |
| 2014/0004015 | A1 * | 1/2014 | Denton et al. ................ | 422/187 |
| 2014/0005444 | A1 * | 1/2014 | Komplin et al. ............. | 568/861 |
| 2014/0005445 | A1 * | 1/2014 | Komplin et al. ............. | 568/861 |
| 2014/0031599 | A1 * | 1/2014 | Komplin et al. ............. | 585/240 |
| 2014/0096764 | A1 * | 4/2014 | Komplin et al. ................ | 127/1 |
| 2014/0109464 | A1 * | 4/2014 | Powell et al. ................ | 44/307 |
| 2014/0114082 | A1 * | 4/2014 | van Walsem et al. ........ | 549/509 |
| 2014/0116425 | A1 * | 5/2014 | Powell et al. .................... | 127/2 |
| 2014/0117275 | A1 * | 5/2014 | Powell et al. ........... | 252/182.31 |
| 2014/0117277 | A1 * | 5/2014 | Powell et al. ........... | 252/182.31 |
| 2014/0121418 | A1 * | 5/2014 | Powell et al. ................ | 568/799 |
| 2014/0121419 | A1 * | 5/2014 | Powell et al. ................ | 568/861 |
| 2014/0121420 | A1 * | 5/2014 | Powell et al. ................ | 568/865 |
| 2014/0128639 | A1 * | 5/2014 | Powell et al. ................ | 568/840 |
| 2014/0171694 | A1 * | 6/2014 | Powell et al. ................ | 568/903 |
| 2014/0275513 | A1 * | 9/2014 | Powell .......................... | 536/56 |
| 2014/0275514 | A1 * | 9/2014 | Powell et al. ................ | 536/56 |
| 2014/0275515 | A1 * | 9/2014 | Powell et al. ................ | 536/56 |
| 2014/0330049 | A1 * | 11/2014 | Powell et al. ................ | 568/865 |

FOREIGN PATENT DOCUMENTS

| | | |
|---|---|---|
| FR | 2955118 | 7/2011 |
| WO | 2012060961 | 5/2012 |
| WO | WO2012174103 | 12/2012 |
| WO | WO2013089798 | 6/2013 |
| WO | WO2013089799 | 6/2013 |
| WO | 2014004844 | 1/2014 |
| WO | 2014004867 | 1/2014 |
| WO | WO2014004842 | 1/2014 |
| WO | WO2014004848 | 1/2014 |
| WO | WO2014004859 | 1/2014 |

OTHER PUBLICATIONS

ISR—PCT/US2013/066660, International Search Report dated Mar. 10, 2014.
ISR—PCT/US2013/066666, International Search Report dated Feb. 14, 2014.
ISR—PCT/US2013/066631, International Search Report dated Feb. 21, 2014.
ISR—PCT/US2013/066623, International Search Report dated Feb. 12, 2014.
ISR—PCT/US2013/066653, International Search Report dated Mar. 10, 2014.
ISR—PCT/US2013/066625, International Search Report dated Mar. 10, 2014.
ISR—PCT/US2013/066638, International Search Report dated Dec. 13, 2013.
ISR—PCT/US2013/066642, International Search Report dated Dec. 12, 2013.
State Intellectual Property Office of the People's Republic of China, Notification of the First Office Action dated Dec. 17, 2015 for Application No. 201380055404.4.

* cited by examiner

METHODS AND SYSTEMS FOR DISTRIBUTING A SLURRY CATALYST IN CELLULOSIC BIOMASS SOLIDS

The present application claims the benefit of U.S. Provisional Patent Application Ser. No. 61/720,757, filed Oct. 31, 2012, the entire disclosure of which is hereby incorporated by reference.

FIELD OF THE INVENTION

The present disclosure generally relates to digestion of cellulosic biomass solids, and, more specifically, to methods for processing a phenolics liquid phase comprising lignin that may be obtained in conjunction with hydrothermal digestion of cellulosic biomass solids.

BACKGROUND OF THE INVENTION

A number of substances of commercial significance may be produced from natural sources, including biomass. Cellulosic biomass may be particularly advantageous in this regard due to the versatility of the abundant carbohydrates found therein in various forms. As used herein, the term "cellulosic biomass" refers to a living or recently living biological material that contains cellulose. The lignocellulosic material found in the cell walls of higher plants is the world's largest source of carbohydrates. Materials commonly produced from cellulosic biomass may include, for example, paper and pulpwood via partial digestion, and bioethanol by fermentation.

Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin that is covalently crosslinked to hemicellulose. Hemicellulose and pectin are typically found in abundance, but cellulose is the predominant polysaccharide and the most abundant source of carbohydrates. The complex mixture of constituents that is co-present with the cellulose can make its processing difficult, as discussed hereinafter. Lignin, in particular, may be an especially difficult component to deal with.

Significant attention has been placed on developing fossil fuel alternatives derived from renewable resources. Cellulosic biomass has garnered particular attention in this regard due to its abundance and the versatility of the various constituents found therein, particularly cellulose and other carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). Moreover, conventional bio-based processes have produced intermediates in dilute aqueous solutions (>50% water by weight) that are difficult to further process. Energy- and cost-efficient processes for processing cellulosic biomass into fuel blends having similar compositions to fossil fuels would be highly desirable to address the foregoing issues and others.

When converting cellulosic biomass into fuel blends and other materials, cellulose and other complex carbohydrates therein can be extracted and transformed into simpler organic molecules, which can be further reformed thereafter. Fermentation is one process whereby complex carbohydrates from cellulosic biomass may be converted into a more usable form. However, fermentation processes are typically slow, require large volume reactors and high dilution conditions, and produce an initial reaction product having a low energy density (ethanol). Digestion is another way in which cellulose and other complex carbohydrates may be converted into a more usable form. Digestion processes can break down cellulose and other complex carbohydrates within cellulosic biomass into simpler, soluble carbohydrates that are suitable for further transformation through downstream reforming reactions. As used herein, the term "soluble carbohydrates" refers to monosaccharides or polysaccharides that become solubilized in a digestion process. Although the underlying chemistry is understood behind digesting cellulose and other complex carbohydrates and further transforming simple carbohydrates into organic compounds reminiscent of those present in fossil fuels, high-yield and energy-efficient digestion processes suitable for converting cellulosic biomass into fuel blends have yet to be developed. In this regard, the most basic requirement associated with converting cellulosic biomass into fuel blends using digestion and other processes is that the energy input needed to bring about the conversion should not be greater than the available energy output of the product fuel blends. This basic requirement leads to a number of secondary issues that collectively present an immense engineering challenge that has not been solved heretofore.

The issues associated with converting cellulosic biomass into fuel blends in an energy- and cost-efficient manner using digestion are not only complex, but they are entirely different than those that are encountered in the digestion processes commonly used in the paper and pulpwood industry. Since the intent of cellulosic biomass digestion in the paper and pulpwood industry is to retain a solid material (e.g., wood pulp), incomplete digestion is usually performed at low temperatures (e.g., less than about 100° C.) for a fairly short period of time. In contrast, digestion processes suitable for converting cellulosic biomass into fuel blends and other materials are ideally configured to maximize yields by solubilizing as much of the original cellulosic biomass charge as possible in a high-throughput manner. Paper and pulpwood digestion processes also typically remove lignin from the raw cellulosic biomass prior to pulp formation. Although digestion processes used in connection with forming fuel blends and other materials may likewise remove lignin prior to digestion, these extra process steps may impact the energy efficiency and cost of the biomass conversion process. The presence of lignin during high-conversion cellulosic biomass digestion may be particularly problematic.

Production of soluble carbohydrates for use in fuel blends and other materials via routine modification of paper and pulpwood digestion processes is not believed to be economically feasible for a number of reasons. Simply running the digestion processes of the paper and pulpwood industry for a longer period of time to produce more soluble carbohydrates is undesirable from a throughput standpoint. Use of digestion promoters such as strong alkalis, strong acids, or sulfites to accelerate the digestion rate can increase process costs and complexity due to post-processing separation steps and the possible need to protect downstream components from these agents. Accelerating the digestion rate by increasing the digestion temperature can actually reduce yields due to thermal degradation of soluble carbohydrates that can occur at elevated digestion temperatures, particularly over extended periods of time. Once produced by digestion, soluble carbohydrates are very reactive and can rapidly degrade to produce caramelans and other heavy ends degradation products, especially under higher temperature conditions, such as above about 150° C. Use of higher digestion temperatures can also be undesirable from an energy efficiency standpoint. Any of these difficulties can defeat the economic viability of fuel blends derived from cellulosic biomass.

One way in which soluble carbohydrates can be protected from thermal degradation is through subjecting them to one or more catalytic reduction reactions, which may include hydrogenation and/or hydrogenolysis reactions. Stabilizing soluble carbohydrates through conducting one or more catalytic reduction reactions may allow digestion of cellulosic biomass to take place at higher temperatures than would otherwise be possible without unduly sacrificing yields. Depending on the reaction conditions and catalyst used, reaction products formed as a result of conducting one or more catalytic reduction reactions on soluble carbohydrates may comprise one or more alcohol functional groups, particularly including triols, diols, monohydric alcohols, and any combination thereof, some of which may also include a residual carbonyl functionality (e.g., an aldehyde or a ketone). Such reaction products are more thermally stable than soluble carbohydrates and may be readily transformable into fuel blends and other materials through conducting one or more downstream reforming reactions. In addition, the foregoing types of reaction products are good solvents in which a hydrothermal digestion may be performed, thereby promoting solubilization of soluble carbohydrates as their reaction products. Although a digestion solvent may also promote solubilization of lignin, this material may still be difficult to effectively process due to its poor solubility and precipitation propensity.

A particularly effective manner in which soluble carbohydrates may be formed and converted into more stable compounds is through conducting the hydrothermal digestion of cellulosic biomass in the presence of molecular hydrogen and a slurry catalyst capable of activating the molecular hydrogen (also referred to herein as a "hydrogen-activating catalyst" or "hydrocatalytic catalyst"). That is, in such approaches (termed "in situ catalytic reduction reaction processes" herein), the hydrothermal digestion of cellulosic biomass and the catalytic reduction of soluble carbohydrates produced therefrom may take place in the same vessel. As used herein, the term "slurry catalyst" will refer to a catalyst comprising fluidly mobile catalyst particles that can be at least partially suspended in a fluid phase via gas flow, liquid flow, mechanical agitation, or any combination thereof. If the slurry catalyst is sufficiently well distributed in the cellulosic biomass, soluble carbohydrates formed during hydrothermal digestion may be intercepted and converted into more stable compounds before they have had an opportunity to significantly degrade. Without adequate catalyst distribution being realized, soluble carbohydrates produced by in situ catalytic reduction reaction processes may still degrade before they have had an opportunity to encounter a catalytic site and undergo a stabilizing reaction. In situ catalytic reduction reaction processes may also be particularly advantageous from an energy efficiency standpoint, since hydrothermal digestion of cellulosic biomass is an endothermic process, whereas catalytic reduction reactions are exothermic. Thus, the excess heat generated by the in situ catalytic reduction reaction(s) may be utilized to drive the hydrothermal digestion with little opportunity for heat transfer loss to occur, thereby lowering the amount of additional heat energy input needed to conduct the digestion.

Another issue associated with the processing of cellulosic biomass into fuel blends and other materials is created by the need for high conversion percentages of a cellulosic biomass charge into soluble carbohydrates. Specifically, as cellulosic biomass solids are digested, their size gradually decreases to the point that they can become fluidly mobile. As used herein, cellulosic biomass solids that are fluidly mobile, particularly cellulosic biomass solids that are about 3 mm in size or less, will be referred to as "cellulosic biomass fines." Cellulosic biomass fines can be transported out of a digestion zone of a system for converting cellulosic biomass and into one or more zones where solids are unwanted and can be detrimental. For example, cellulosic biomass fines have the potential to plug catalyst beds, transfer lines, valving, and the like. Furthermore, although small in size, cellulosic biomass fines may represent a non-trivial fraction of the cellulosic biomass charge, and if they are not further converted into soluble carbohydrates, the ability to attain a satisfactory conversion percentage may be impacted. Since the digestion processes of the paper and pulpwood industry are run at relatively low cellulosic biomass conversion percentages, smaller amounts of cellulosic biomass fines are believed to be generated and have a lesser impact on those digestion processes.

In addition to the desired carbohydrates, other substances may be present within cellulosic biomass that can be especially problematic to deal with in an energy- and cost-efficient manner. Sulfur- and/or nitrogen-containing amino acids or other catalyst poisons may be present in cellulosic biomass. If not removed, these catalyst poisons can impact the catalytic reduction reaction(s) used to stabilize soluble carbohydrates, thereby resulting in process downtime for catalyst regeneration and/or replacement and reducing the overall energy efficiency when restarting the process. This issue is particularly significant for in situ catalytic reduction reaction processes, where there is minimal opportunity to address the presence of catalyst poisons, at least without significantly increasing process complexity and cost. As mentioned above, lignin can also be particularly problematic to deal with if it is not removed prior to beginning digestion. During cellulosic biomass processing, the significant quantities of lignin present in cellulosic biomass may lead to fouling of processing equipment, potentially leading to costly system down time. The significant lignin quantities can also lead to realization of a relatively low conversion of the cellulosic biomass into useable substances per unit weight of feedstock.

As evidenced by the foregoing, the efficient conversion of cellulosic biomass into fuel blends and other materials is a complex problem that presents immense engineering challenges. The present disclosure addresses these challenges and provides related advantages as well.

SUMMARY OF THE INVENTION

The present disclosure generally relates to digestion of cellulosic biomass solids, and, more specifically, to methods for processing a phenolics liquid phase comprising lignin that may be obtained in conjunction with hydrothermal digestion of cellulosic biomass solids.

In some embodiments, the present disclosure provides methods comprising: providing cellulosic biomass solids in a digestion solvent; heating the cellulosic biomass solids and the digestion solvent in the presence of molecular hydrogen and a slurry catalyst capable of activating molecular hydrogen, thereby forming a phenolics liquid phase comprising lignin, an aqueous phase comprising an alcoholic component derived from the cellulosic biomass solids, and an optional light organics phase, the slurry catalyst being distributed in the cellulosic biomass solids and at least a portion of the slurry catalyst accumulating in the phenolics liquid phase as it forms; conveying at least a portion of the phenolics liquid phase and the slurry catalyst therein to a location above at least a portion of the cellulosic biomass solids; and after conveying the phenolics liquid phase and the slurry catalyst, releasing them such that they come in contact with the cellulosic biomass solids.

In some embodiments, the present disclosure provides methods comprising: providing cellulosic biomass solids in a digestion solvent; heating the cellulosic biomass solids and the digestion solvent in the presence of molecular hydrogen and a slurry catalyst capable of activating molecular hydrogen, thereby forming a phenolics liquid phase comprising lignin, an aqueous phase comprising an alcoholic component derived from the cellulosic biomass solids, and an optional light organics phase, at least a portion of the slurry catalyst accumulating in the phenolics liquid phase as it forms; conveying at least a portion of the phenolics liquid phase and the slurry catalyst therein to a location above at least a portion of the cellulosic biomass solids; and after conveying the phenolics liquid phase and the slurry catalyst, releasing them and downwardly percolating the phenolics liquid phase and the slurry catalyst through the cellulosic biomass solids.

In some embodiments, the present disclosure describes biomass conversion systems comprising: a hydrothermal digestion unit; a first fluid conduit configured to remove a first fluid from an upper portion of the hydrothermal digestion unit and return the first fluid to a lower portion of the hydrothermal digestion unit; and a second fluid conduit configured to remove a second fluid from a lower portion of the hydrothermal digestion unit and return the second fluid to an upper portion of the hydrothermal digestion unit.

The features and advantages of the present disclosure will be readily apparent to one having ordinary skill in the art upon a reading of the description of the embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
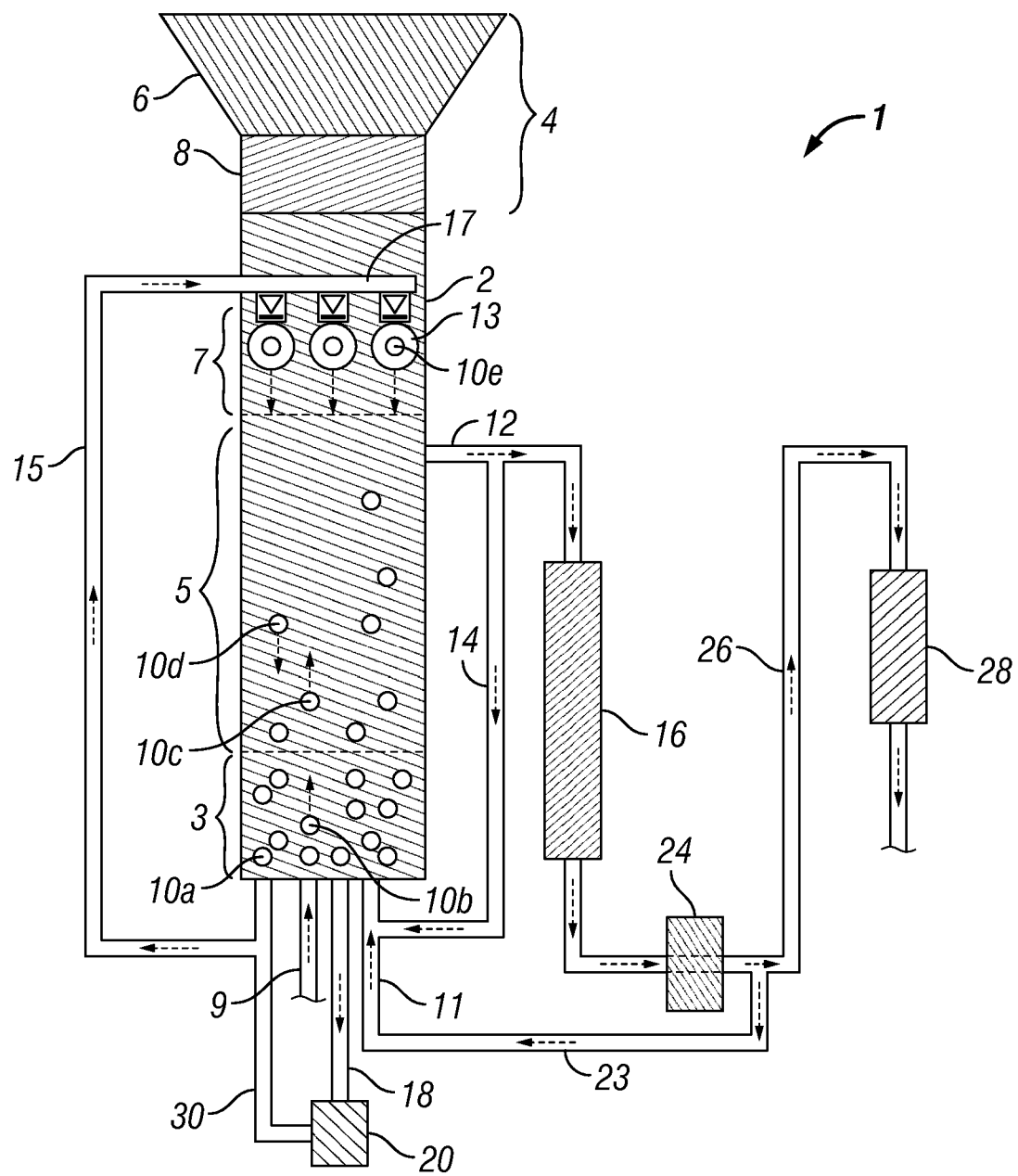
FIGS. 1-3 show schematics of illustrative biomass conversion systems in which a phenolics liquid phase containing a slurry catalyst may be used to promote catalyst distribution in cellulosic biomass solids.

The present disclosure generally relates to digestion of cellulosic biomass solids, and, more specifically, to methods for processing a phenolics liquid phase comprising lignin that may be obtained in conjunction with hydrothermal digestion of cellulosic biomass solids.

In the embodiments described herein, the digestion rate of cellulosic biomass solids may be accelerated in the presence of a digestion solvent. In some instances, the digestion solvent may be maintained at elevated pressures that keep the digestion solvent in a liquid state when raised above its normal boiling point. Although the more rapid digestion rate of cellulosic biomass solids under elevated temperature and pressure conditions may be desirable from a throughput standpoint, soluble carbohydrates may be susceptible to degradation at elevated temperatures, as discussed above. As further discussed above, one approach for addressing the degradation of soluble carbohydrates during hydrothermal digestion is to conduct an in situ catalytic reduction reaction process so as to convert the soluble carbohydrates into more stable compounds as soon as possible after their formation.

Although digesting cellulosic biomass solids by an in situ catalytic reduction reaction process may be particularly advantageous for at least the reasons noted above, successfully executing such a coupled approach may be problematic in other aspects. One significant issue that may be encountered is that of adequate catalyst distribution within the digesting cellulosic biomass solids, since insufficient catalyst distribution can result in poor stabilization of soluble carbohydrates. Although a catalyst might be pre-mixed or co-blended with cellulosic biomass solids and then subjected to an in situ catalytic reduction reaction process, these solutions may still produce inadequate catalyst distribution and present significant engineering challenges that markedly increase process complexity and operational costs. In contrast, the present inventors discovered a relatively simple and low cost engineering solution whereby a slurry catalyst may be effectively distributed within cellulosic biomass solids using fluid flow to convey the slurry catalyst particulates into the interstitial spaces within a charge of cellulosic biomass solids. Although the slurry catalyst may be conveyed into the cellulosic biomass solids using fluid flow from any direction, the present inventors consider it most effective to have at least a portion of the slurry catalyst be conveyed by upwardly directed fluid flow, or at least that upwardly directed fluid flow be present, since such fluid flow may promote expansion of the cellulosic biomass solids and disfavor gravity-induced compaction that occurs during their addition and digestion. In addition, when upwardly directed fluid flow is present, there may be a reduced need to utilize mechanical stirring or like mechanical agitation techniques that might otherwise be needed to obtain an adequate catalyst distribution.

Suitable techniques for using fluid flow to distribute a slurry catalyst within cellulosic biomass solids are described in commonly owned U.S. Patent Applications 61/665,727 and 61/665,627, each filed on Jun. 28, 2012 (PCT/US2013/048239 and PCT/US2013/048248) and incorporated herein by reference in its entirety. As described therein, cellulosic biomass solids may have at least some innate propensity for retaining a slurry catalyst being conveyed by fluid flow, and at least a portion of the cellulosic biomass solids may be sized to better promote such retention. In addition, using fluid flow, particularly upwardly directed fluid flow, to force a slurry catalyst to actively circulate through a charge of digesting cellulosic biomass solids may ensure adequate slurry catalyst distribution as well as advantageously reduce thermal gradients that may occur during hydrothermal digestion. As a further advantage, active circulation of the slurry catalyst may address the problem created by the production of cellulosic biomass fines, since they may be co-circulated with the slurry catalyst for continued digestion to take place.

As alluded to above, lignin can be an especially problematic component of cellulosic biomass solids, whose presence during hydrothermal digestion may need to be addressed in some manner, particularly as the lignin content builds. Lignin buildup may be especially problematic in continuously operating processes in which cellulosic biomass solids are supplied and digested on an ongoing basis. During hydrothermal digestion, lignin may either remain undissolved or precipitate from the digestion solvent, either case presenting opportunities for surface fouling. In further regard to the lignin disposition, the present inventors expected that lignin freed from cellulosic biomass solids would reside predominantly in the same location as an alcoholic component being produced by catalytic reduction of soluble carbohydrates. That is, the inventors expected that the lignin and the alcoholic component would be located in the same phase of the digestion medium before the lignin eventually precipitated.

Surprisingly, while digesting cellulosic biomass solids by an in situ catalytic reduction reaction process in the presence of a slurry catalyst, where the cellulosic biomass solids were supplied on an ongoing basis, the present inventors discovered that the lignin predominantly separated as a phenolics liquid phase that was neither fully dissolved nor fully precipitated, but instead formed as a discrete liquid phase that was highly viscous and hydrophobic. In many cases, the phenolics liquid phase was below an aqueous phase containing an alcoholic component derived from the cellulosic biomass solids. Depending on the ratio of water and organic solvent in the digestion solvent, rates of fluid flow, catalyst identity, reaction times and temperatures, and the like, a light organics phase was also sometimes observed, typically above the aqueous phase, where the components of the light organics phase were also derived, at least in part, from the cellulosic materials in the biomass. Components present in the light organics phase included, for example, the desired alcoholic component, including $C_4$ or greater alcohols, and self-condensation products, such as those obtained by the acid-catalyzed Aldol reaction. Formation of the phenolics liquid phase was particularly surprising, since batch processing using only a single addition of cellulosic biomass solids routinely produced only a two-phase mixture of light organics and an aqueous phase containing an alcoholic component. Similar results were obtained using isolated carbohydrates or cellulose under test reaction conditions. Thus, in the presence of excessive lignin quantities or components derived therefrom, at least a portion of the desired alcoholic component derived from the cellulosic biomass solids could either be located in the middle aqueous phase of a three-phase mixture or in the upper phase of a two-phase mixture. This phase behavior alone represented a significant engineering challenge, since a system for further reforming the alcoholic component in the aqueous phase would need to be configured to withdraw the correct phase depending on the particular conditions present during hydrothermal digestion. Ultimately, it was found that the phenolics liquid phase and the aqueous phase could be either separated from another for subsequent processing or at least partially combined together for processing of the alcoholic component therein. Moreover, processing of the alcoholic component in the light organics phase may take place jointly with the alcoholic component from the aqueous phase, or it may be processed separately.

The present inventors found that formation of the phenolics liquid phase significantly impacted the ability to successfully conduct an in situ catalytic reduction reaction process, since the phenolics liquid phase increased the difficulty of distributing the slurry catalyst in the cellulosic biomass solids. Specifically, the inventors discovered that the slurry catalyst is readily wetted by the phenolics liquid phase and accumulates therein over time, thereby making the catalyst less available for distribution within the cellulosic biomass solids. Moreover, once the slurry catalyst has accumulated in the phenolics liquid phase, the high density and viscosity of this phase may make it difficult to liberate and distribute a sufficient amount of the slurry catalyst to adequately stabilize soluble carbohydrates, even when upwardly directed fluid flow is present. Although at least a portion of the phenolics liquid phase may be upwardly flowed or a fluid stream may be directed through the phenolics liquid phase to promote distribution of the slurry catalyst in the cellulosic biomass solids, the high density of the phenolics liquid phase may make complete slurry catalyst distribution difficult by using this approach by itself. That is, it may be difficult to force the phenolics liquid phase upward through the cellulosic biomass solids such that the slurry catalyst is adequately distributed. Accordingly, the upper portions of the cellulosic biomass solids may not have sufficient amounts of distributed slurry catalyst to promote stabilization of soluble carbohydrates.

The present inventors determined that a slurry catalyst can still be effectively distributed in cellulosic biomass solids even when significant amounts of the catalyst are accumulated in a phenolics liquid phase. Specifically, the inventors determined that if at least a portion of the phenolics liquid phase and slurry catalyst therein is conveyed to a location above at least a portion of the cellulosic biomass solids and released, the slurry catalyst may become distributed in the cellulosic biomass solids as the catalyst contacts the cellulosic biomass solids and progresses downward. The phenolics liquid phase and the slurry catalyst may downwardly percolate through the cellulosic biomass solids below the release location, or the slurry catalyst may become adhered to the cellulosic biomass and progress downward as digestion and settling take place. Either mode of catalyst delivery from above may result in catalyst distribution within the cellulosic biomass solids. Downward percolation of the phenolics liquid phase may be aided by the relatively high density of this phase and its immiscibility with other liquid phases (e.g., an aqueous digestion solvent) present in the hydrothermal digestion unit. Moreover, downward motion of the slurry catalyst may be used alone to affect distribution of the slurry catalyst, or it may be used in combination with upwardly directed fluid flow to affect catalyst distribution by two different means.

Unless otherwise specified, it is to be understood that use of the terms "biomass" or "cellulosic biomass" in the description herein refers to "cellulosic biomass solids." Solids may be in any size, shape, or form. The cellulosic biomass solids may be natively present in any of these solid sizes, shapes, or forms, or they may be further processed prior to hydrothermal digestion. In some embodiments, the cellulosic biomass solids may be chopped, ground, shredded, pulverized, and the like to produce a desired size prior to hydrothermal digestion. In some or other embodiments, the cellulosic biomass solids may be washed (e.g., with water, an acid, a base, combinations thereof, and the like) prior to hydrothermal digestion taking place.

In practicing the present embodiments, any type of suitable cellulosic biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Illustrative carbohydrates that may be present in cellulosic biomass solids include, for example, sugars, sugar alcohols, celluloses, lignocelluloses, hemicelluloses, and any combination thereof. Once soluble carbohydrates have been produced through hydrothermal digestion according to the embodiments described herein, the soluble carbohydrates may be transformed into a more stable reaction product comprising an alcoholic component, which may comprise a monohydric alcohol, a glycol, a triol, or any combination thereof in various embodiments. As used herein, the term "glycol" will refer to compounds containing two alcohol functional groups, two alcohol functional groups and a carbonyl functionality, or any combination thereof. As used herein, the term "carbonyl functionality" will refer to an aldehyde functionality or a ketone functionality. In some embodiments, a glycol may comprise a significant fraction of the reaction product. Although a glycol may comprise a significant fraction of the reaction product, it is to be recognized that other alcohols, including triols and monohydric alcohols, for example, may also be present. Further, any of these alcohols may further include a carbonyl functionality. As used herein, the term "triol" will refer to compounds containing three alcohol functional groups, three alcohol functional groups and a carbonyl functionality, and any combination thereof. As used herein, the term "monohydric alcohol" will refer to compounds containing one alcohol functional group, one alcohol functional group and a carbonyl functionality, and any combination thereof.

As used herein, the term "phenolics liquid phase" refers to a fluid phase comprising liquefied lignin. In some embodiments, the phenolics liquid phase may be more dense than water, but it may be less dense than water depending on lignin concentrations and the presence of other components, for example.

As used herein, the term "alcoholic component" refers to a monohydric alcohol, glycol, triol, or any combination thereof that is formed from a catalytic reduction reaction of soluble carbohydrates derived from cellulosic biomass solids.

As used herein, the term "light organics phase" refers to a fluid phase that is typically less dense than water and comprises an organic compound. The organic compound may include at least a portion of the alcoholic component formed via catalytic reduction of soluble carbohydrates, which may include $C_4$ or greater alcohols and self-condensation products thereof.

As used herein, the term "percolate" and variants thereof refers to downward motion of a fluid phase through a bed of solids, particularly downward motion of a slurry catalyst in a phenolics liquid phase through a bed of cellulosic biomass solids about which is disposed a continuous-phase digestion solvent.

In some embodiments, methods described herein can comprise: providing cellulosic biomass solids in a digestion solvent; heating the cellulosic biomass solids and the digestion solvent in the presence of molecular hydrogen and a slurry catalyst capable of activating molecular hydrogen, thereby forming a phenolics liquid phase comprising lignin, an aqueous phase comprising an alcoholic component derived from the cellulosic biomass solids, and an optional light organics phase, the slurry catalyst being distributed in the cellulosic biomass solids and at least a portion of the slurry catalyst accumulating in the phenolics liquid phase as it forms; conveying at least a portion of the phenolics liquid phase and the slurry catalyst therein to a location above at least a portion of the cellulosic biomass solids; and after conveying the phenolics liquid phase and the slurry catalyst, releasing them such that come in contact with the cellulosic biomass solids.

In some embodiments, the phenolics liquid phase and the slurry catalyst may downwardly percolate through the cellulosic biomass solids after coming in contact with the cellulosic biomass solids. For example, in some embodiments, the phenolics liquid phase may form droplets containing the slurry catalyst that downwardly percolate through the cellulosic biomass solids. Specifically, droplets of the phenolics liquid phase may percolate through a continuous-phase digestion solvent disposed about the cellulosic biomass solids in order to affect distribution of the slurry catalyst. In some or other embodiments, the phenolics liquid phase and the slurry catalyst may adhere to the cellulosic biomass solids and progress downward as the cellulosic biomass solids are digested.

In some embodiments, methods described herein can comprise: providing cellulosic biomass solids in a digestion solvent; heating the cellulosic biomass solids and the digestion solvent in the presence of molecular hydrogen and a slurry catalyst capable of activating molecular hydrogen, thereby forming a phenolics liquid phase comprising lignin, an aqueous phase comprising an alcoholic component derived from the cellulosic biomass solids, and an optional light organics phase, at least a portion of the slurry catalyst accumulating in the phenolics liquid phase as it forms; conveying at least a portion of the phenolics liquid phase and the slurry catalyst therein to a location above at least a portion of the cellulosic biomass solids; and after conveying the phenolics liquid phase and the slurry catalyst, releasing them and downwardly percolating the phenolics liquid phase and the slurry catalyst through the cellulosic biomass solids.

In some embodiments, the alcoholic component may be formed by a catalytic reduction reaction of soluble carbohydrates, where the soluble carbohydrates are derived from the cellulosic biomass solids. In some embodiments, the alcoholic component may comprise a monohydric alcohol, a glycol, a triol, or any combination thereof. In some embodiments, the alcoholic component may comprise a glycol. Cellulosic biomass contains approximately 50% water by weight, and approximately 30% of the dry portion comprises lignin biopolymer. Accordingly, cellulosic biomass solids contain up to about 35 percent by weight cellulosic material (70% cellulosic material by weight on a dry basis) that can be converted into soluble carbohydrates and products derived therefrom, including glycols. In some embodiments, at least about 5 percent by weight of the cellulosic biomass solids may be converted into a glycol. In other embodiments, at least about 10 percent by weight of the cellulosic biomass solids may be converted into a glycol. In some embodiments, between about 5% and about 35% of the cellulosic biomass solids by weight may be converted into a glycol, or between about 10% and about 30% of the cellulosic biomass solids by weight, or between about 5% and about 25% of the cellulosic biomass solids by weight, or between about 5% and about 20% of the cellulosic biomass solids by weight, or between about 5% and about 15% of the cellulosic biomass solids by weight, or between about 10% and about 25% of the cellulosic biomass solids by weight, or between about 10% and about 20% of the cellulosic biomass solids by weight, or between about 10% and about 15% of the cellulosic biomass solids by weight. Separation and recycle of the glycol may be used to increase the glycol content of the digestion solvent. For example, in some embodiments, the digestion solvent may comprise between about 10% glycol and about 90% glycol by weight.

In various embodiments, soluble carbohydrates produced from cellulosic biomass solids may be converted into a reaction product comprising a glycol via a catalytic reduction reaction mediated by a catalyst that is capable of activating molecular hydrogen. As described in commonly owned U.S. Patent Applications 61/720,704 and 61/720,714, filed Oct. 31, 2012, entitled "Methods for Production and Processing of a Glycol Reaction Product Obtained from Hydrothermal Digestion of Cellulosic Biomass Solids" and "Methods for Conversion of a Glycol Reaction Product Obtained from Hydrothermal Digestion of Cellulosic Biomass Solids Into a Dried Monohydric Alcohol Feed," and incorporated herein by reference in its entirety, production of glycols may present several process advantages, particularly with regard to downstream reforming reactions. In other aspects, formation of monohydric alcohols may be more desirable. In some embodiments, the catalytic reduction reaction may take place at a temperature ranging between about 110° C. and about 300° C., or between about 170° C. and about 300° C., or between about 180° C. and about 290° C., or between about 150° C. and about 250° C. In some embodiments, the catalytic reduction reaction may take place at a pH ranging between about 7 and about 13, or between about 10 and about 12. In other embodiments, the catalytic reduction reaction may take place under acidic conditions, such as a pH of about 5 to about 7. In some embodiments, the catalytic reduction reaction may be conducted under a hydrogen partial pressure ranging between about 1 bar (absolute) and about 150 bar, or between about 15 bar and about 140 bar, or between about 30 bar and about 130 bar, or between about 50 bar and about 110 bar. In some embodiments, the catalyst that is capable of activating molecular hydrogen may comprise a slurry catalyst. As described above, slurry catalysts may be particularly desirable for use in conjunction with in situ catalytic reduction reaction processes. For embodiments in which an in situ catalytic reduction reaction process is not used to form the alcoholic component, any type of catalyst may be used including, for example, slurry catalysts, fixed bed catalysts, ebullating bed catalysts, and the like.

In some embodiments, catalysts capable of activating molecular hydrogen and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, the catalyst that is capable of activating molecular hydrogen may comprise a slurry catalyst. In some embodiments, the slurry catalyst may comprise a poison-tolerant catalyst. As used herein the term "poison-tolerant catalyst" refers to a catalyst that is capable of activating molecular hydrogen without needing to be regenerated or replaced due to low catalytic activity for at least about 12 hours of continuous operation. Use of a poison-tolerant catalyst may be particularly desirable when reacting soluble carbohydrates derived from cellulosic biomass solids that have not had catalyst poisons removed therefrom. Catalysts that are not poison tolerant may also be used to achieve a similar result, but they may need to be regenerated or replaced more frequently than does a poison-tolerant catalyst.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned United States Patent Application Publications 2013/0109896, and 2012/0317872, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in United States Patent Application Publication No. 20100236988, and incorporated herein by reference in its entirety.

In various embodiments, slurry catalysts used in conjunction with the methods described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron. In some embodiments, the slurry catalyst may comprise catalyst fines in the processes described herein. As used herein, the term "catalyst fines" refers to solid catalysts having a nominal particulate size of about 100 microns or less. Catalyst fines may be generated from catalyst production processes, for example, during extrusion of solid catalysts. Catalyst fines may also be produced by grinding larger catalyst solids or during regeneration of catalyst solids. Suitable methods for producing catalyst fines are described in U.S. Pat. Nos. 6,030,915 and 6,127,229, each of which is incorporated herein by reference in its entirety. In some instances, catalyst fines may be intentionally removed from a solid catalyst production run, since they may be difficult to sequester in some catalytic processes. Techniques for removing catalyst fines from larger catalyst solids may include, for example, sieving or like size separation processes. When conducting in situ catalytic reduction reaction processes, such as those described herein, catalyst fines may be particularly well suited, since they can be easily fluidized and distributed in the interstitial pore space of the digesting cellulosic biomass solids.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, the catalysts used in conjunction with the processes described herein may be operable to generate molecular hydrogen. For example, in some embodiments, catalysts suitable for aqueous phase reforming (i.e., APR catalysts) may be used. Suitable APR catalysts may include, for example, catalysts comprising Pt, Pd, Ru, Ni, Co, or other Group VIII metals alloyed or modified with Re, Mo, Sn, or other metals. Thus, in some embodiments described herein, an external hydrogen feed may not be needed in order to effectively carry out the stabilization of soluble carbohydrates by a catalytic reduction reaction. However, in other embodiments, an external hydrogen feed may be used, optionally in combination with internally generated hydrogen.

In some embodiments, heating the cellulosic biomass solids and the digestion solvent in the presence of molecular hydrogen and the slurry catalyst may take place in a hydrothermal digestion unit. Suitable hydrothermal digestion units configured for circulating a liquid phase therethrough are described in commonly owned U.S. Patent Application 61/655,717, filed on Jun. 28, 2012 (PCT/US2013/048212) and incorporated herein by reference in its entirety. Specifically, the hydrothermal digestion units described therein may comprise a fluid circulation loop through which the liquid phase and optionally the slurry catalyst are circulated for distribution in the cellulosic biomass solids (e.g., using upwardly directed fluid flow). In various embodiments, hydrothermal digestion units suitable for conveying a phenolics liquid phase may further comprise a fluid conduit for conveying the phenolics liquid phase from a lower portion of the hydrothermal digestion unit to a location above at least a portion of the cellulosic biomass solids. In some embodiments, the fluid conduit may convey the phenolics liquid phase to an upper portion of the hydrothermal digestion unit. In other embodiments, the fluid conduit may convey the phenolics liquid phase to a location where the phenolics liquid phase and slurry catalyst may contact the cellulosic biomass solids before they are introduced to the hydrothermal digestion unit. In the foregoing embodiments, the phenolics liquid phase and the slurry catalyst are conveyed external to the cellulosic biomass solids (i.e., such that the phenolics liquid phase, while being conveyed, does not contact the cellulosic biomass solids). The fluid conduit that conveys the phenolics liquid phase may be external to the hydrothermal digestion unit, or it may comprise an internal structure of the hydrothermal digestion unit that is isolated from the cellulosic biomass solids therein. Optionally, the fluid circulation loop described above may be omitted if it is intended that catalyst distribution takes place solely through downward motion of the conveyed phenolics liquid phase. Further discussion of hydrothermal digestion units and systems suitable for processing cellulosic biomass solids in the presence of a phenolics liquid phase are described in additional detail below.

In some embodiments, the fluid conduit configured for conveying a phenolics liquid phase from a lower portion of the hydrothermal digestion unit may fluidly connect the bottom of the hydrothermal digestion unit to an upper portion of the hydrothermal digestion unit. As used herein, the term "lower portion" refers to the lower 25% of a hydrothermal digestion unit's height. As used herein, the term "upper portion" refers to any region of a hydrothermal digestion unit that is above the lower 25% of its height. In some embodiments, the fluid conduit may fluidly connect the bottom of the hydrothermal digestion unit to the top of the hydrothermal digestion unit. In some embodiments, the fluid conduit may fluidly connect one or more points between the bottom of the hydrothermal digestion unit and 25% of its height to one or more points that are between 25% and 50% of its height. In some embodiments, the fluid conduit may fluidly connect one or more points between the bottom of the hydrothermal digestion unit and 25% of its height to one or more points that are between 50% and 75% of its height. In some embodiments, the fluid conduit may fluidly connect one or more points between the bottom of the hydrothermal digestion unit and 25% of its height to one or more points that are between 75% of its height and the top of the hydrothermal digestion unit. In various embodiments, the fluid conduit may fluidly connect to an upper portion of the hydrothermal digestion unit at one point or at more than one point. When connected at more than one point, each fluid connection of the fluid conduit may be at substantially the same height on the hydrothermal digestion unit or at different heights.

In some or other embodiments, the fluid conduit configured for conveying a phenolics liquid phase from a lower portion of the hydrothermal digestion unit may deliver the phenolics liquid phase to the cellulosic biomass solids before they are introduced to the hydrothermal digestion unit. In such embodiments, the phenolics liquid phase and slurry catalyst may wet the cellulosic biomass solids and adhere thereto. In some embodiments, the phenolics liquid phase may be conveyed to the cellulosic biomass solids in an atmospheric pressure holding vessel before they are introduced to the hydrothermal digestion unit. In other embodiments, the phenolics liquid phase may be conveyed to the cellulosic biomass solids in a pressurization vessel being used to elevate the cellulosic biomass solids from atmospheric pressure to an operating pressure of the hydrothermal digestion unit.

In some embodiments, the phenolics liquid phase may be conveyed to a location that is above all of the cellulosic biomass solids. That is, once released, the phenolics liquid phase and slurry catalyst therein have the opportunity progress downward through the entire charge of cellulosic biomass solids. In some or other embodiments, at least a portion of the phenolics liquid phase may be conveyed into the cellulosic biomass solids, and at least a portion of the phenolics liquid phase may be conveyed to a location that is above the cellulosic biomass solids. That is, in such embodiments, at least a portion of the phenolics liquid phase may be introduced directly into the cellulosic biomass solids, rather than being introduced to the cellulosic biomass solids only from above. Direct introduction of at least a portion of the phenolics liquid phase to the cellulosic biomass solids may be performed, for example, if total introduction of the phenolics liquid phase from above does not result in effective contact of the slurry catalyst with the entire charge of cellulosic biomass solids. For example, if the phenolics liquid phase adheres strongly to the cellulosic biomass solids rather than percolating therethrough, direct introduction of the phenolics liquid phase into the cellulosic biomass solids at one or more points may be used to affect distribution of the slurry catalyst into locations that would otherwise not be contacted by the catalyst.

In some embodiments, an exit of the fluid conduit that fluidly connects a lower portion of the hydrothermal digestion unit to an upper portion of the hydrothermal digestion unit may be operably connected to a flow dispersal system in the upper portion of the hydrothermal digestion unit. The flow dispersal system may assist in spreading the phenolics liquid phase over the cellulosic biomass solids, thereby promoting better catalyst distribution. Suitable flow dispersal systems are not particularly limited in size, shape, form, or function and will be familiar to one having ordinary skill in the art. In some embodiments, the flow dispersal system may comprise a structure having a plurality of openings therein, through which the phenolics liquid phase passes and is divided into a plurality of flow streams. In some embodiments, the flow dispersal system may comprise a nozzle, a nebulizer, a sprayer, drip irrigator, or like mechanism that produces a plurality of droplets comprising the phenolics liquid phase and slurry catalyst therein. In such embodiments, after being released, the droplets of the phenolics liquid phase may downwardly percolate through the cellulosic biomass solids in a continuous-phase digestion solvent disposed about the cellulosic biomass solids, or at least a portion of the droplets may become adhered to the cellulosic biomass solids. In various embodiments, the flow dispersal system may be configured to produce droplets that are sufficiently large that they are substantially non-buoyant in the aqueous phase and percolate through the cellulosic biomass solids. In some embodiments, the flow dispersal system may be configured to produce droplets that are about 3 mm in size or larger, or about 5 mm in size or larger, or about 10 mm in size or larger. In some embodiments, the flow dispersal system may be configured to produce droplets that range from about 3 mm to about 20 mm in size, or from about 3 mm to about 10 mm in size, or from about 5 mm to about 15 mm in size, or from about 5 mm to about 10 mm in size.

In some embodiments, heating of the cellulosic biomass solids and the digestion solvent to form soluble carbohydrates may take place while the hydrothermal digestion unit is in a pressurized state. As used herein, the term "pressurized state" refers to a pressure that is greater than atmospheric pressure (1 bar). Heating a digestion solvent in a pressurized state may allow the normal boiling point of the digestion solvent to be exceeded, thereby allowing the rate of hydrothermal digestion to be increased relative to lower temperature digestion processes. In some embodiments, heating the cellulosic biomass solids in the hydrothermal digestion unit may take place at a pressure of at least about 30 bar. In some embodiments, heating the cellulosic biomass solids in the hydrothermal digestion unit may take place at a pressure of at least about 60 bar, or at a pressure of at least about 90 bar. In some embodiments, heating the cellulosic biomass solids in the hydrothermal digestion unit may take place at a pressure ranging between about 30 bar and about 430 bar. In some embodiments, heating the cellulosic biomass solids in the hydrothermal digestion unit may take place at a pressure ranging between about 50 bar and about 330 bar, or at a pressure ranging between about 70 bar and about 130 bar, or at a pressure ranging between about 30 bar and about 130 bar.

In some embodiments, the cellulosic biomass solids may be maintained at pressure of at least about 30 bar and heated at a temperature of at least about 150° C. In some embodiments, the cellulosic biomass solids may be maintained at a pressure of at least about 70 bar, or at a pressure of least about 100 bar, and heated at a temperature of at least about 150° C. In some or other embodiments, the cellulosic biomass solids may be heated at a temperature of at least about 200° C., or at least about 250° C., or at least about 300° C.

In some embodiments, the hydrothermal digestion unit may be charged with a fixed amount of slurry catalyst, while cellulosic biomass solids are continuously or semi-continuously fed thereto, thereby allowing hydrothermal digestion to take place in a continual manner. That is, fresh cellulosic biomass solids may be added to the hydrothermal digestion unit on a continual or an as-needed basis in order to replenish cellulosic biomass solids that have been digested to form soluble carbohydrates. As noted above, ongoing addition of cellulosic biomass solids to the hydrothermal digestion unit may result in formation of the phenolics liquids phase. In some embodiments, the cellulosic biomass solids may be continuously or semi-continuously added to the hydrothermal digestion unit while the hydrothermal digestion unit is in a pressurized state. In some embodiments, the pressurized state may comprise a pressure of at least about 30 bar. Without the ability to introduce fresh cellulosic biomass to a pressurized hydrothermal digestion unit, depressurization and cooling of the hydrothermal digestion unit may take place during biomass addition, significantly reducing the energy- and cost-efficiency of the biomass conversion process. As used herein, the term "continuous addition" and grammatical equivalents thereof will refer to a process in which cellulosic biomass solids are added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of cellulosic biomass solids to a hydrothermal digestion unit without fully depressurizing the hydrothermal digestion unit. Techniques through which cellulosic biomass solids may be added continuously or semi-continuously to a pressurized hydrothermal digestion unit are discussed in more detail herein below.

In some embodiments, cellulosic biomass solids being continuously or semi-continuously added to the hydrothermal digestion unit may be pressurized before being added to the hydrothermal digestion unit, particularly when the hydrothermal digestion unit is in a pressurized state. Pressurization of the cellulosic biomass solids from atmospheric pressure to a pressurized state may take place in one or more pressurization zones before addition of the cellulosic biomass solids to the hydrothermal digestion unit. Suitable pressurization zones that may be used for pressurizing and introducing cellulosic biomass solids to a pressurized hydrothermal digestion unit are described in more detail in commonly owned United States Patent Application Publications 2013/0152457 and 2013/0152458, and incorporated herein by reference in its entirety. Suitable pressurization zones described therein may include, for example, pressure vessels, pressurized screw feeders, and the like. In some embodiments, multiple pressurization zones may be connected in series to increase the pressure of the cellulosic biomass solids in a stepwise manner.

In various embodiments described herein, a slurry catalyst may be at least partially distributed within a charge of cellulosic biomass solids. As used herein, the terms "distribute," "distribution," and variants thereof refer to a condition in which a slurry catalyst is present at all heights of a charge of cellulosic biomass. No particular degree of distribution is implied by use of the term "distribute" or its variants. In some embodiments, the distribution may comprise a substantially homogeneous distribution, such that a concentration of the slurry catalyst is substantially the same at all heights of a cellulosic biomass charge. In other embodiments, the distribution may comprise a heterogeneous distribution, such that different concentrations of the slurry catalyst are present at different heights of the cellulosic biomass charge. When a heterogeneous distribution of the slurry catalyst is present, a concentration of the slurry catalyst within the cellulosic biomass solids may increase from top to bottom in some embodiments or decrease from top to bottom in other embodiments. In some embodiments, a heterogeneous distribution may comprise an irregular concentration gradient.

In some embodiments, at least a portion of the slurry catalyst may be circulated through a fluid circulation loop external to the hydrothermal digestion unit, such that slurry catalyst particulates exiting one end of the charge of cellulosic biomass solids are subsequently reintroduced to the opposite end of the charge. As used herein, the term "circulate" and variants thereof will be used to refer to the condition that exists when at least a portion of a slurry catalyst exits a hydrothermal digestion unit and is subsequently reintroduced thereto one or more times via fluid flow. For example, in embodiments in which upwardly directed fluid flow is used to distribute the slurry catalyst in the cellulosic biomass solids, the slurry catalyst particulates may progress through the cellulosic biomass solids, exit the hydrothermal digestion unit, travel through the fluid circulation loop, and then be reintroduced to or near the bottom of the hydrothermal digestion unit. As described above, circulation of the slurry catalyst in the foregoing manner may be used to supplement the downward motion of the slurry catalyst provided by conveying the phenolics liquid phase to a location above at least a portion of the cellulosic biomass solids. Upward circulation of the slurry catalyst may be conducted using the aqueous phase, the phenolics liquid phase, or any combination thereof.

In some embodiments, the phenolics liquid phase containing the slurry catalyst may be circulated through the cellulosic biomass solids. As described above, in some embodiments, the phenolics liquid phase may comprise an upwardly directed fluid flow. In other embodiments, the phenolics liquid phase may comprise a downwardly directed fluid flow of the phenolics liquid phase conveyed to a location above at least a portion of the cellulosic biomass solids. Specifically, in some embodiments, conveying and releasing at least a portion of the phenolics liquid phase may comprise circulating the phenolics liquid phase through the cellulosic biomass solids in a downward manner. In some embodiments, the phenolics liquid phase may be continuously circulated through the cellulosic biomass solids in a downward manner. Continuous circulation may be beneficial to ensure that the slurry catalyst is present throughout a charge of cellulosic biomass solids. In other embodiments, the phenolics liquid phase may be conveyed and released non-continuously such that the phenolics liquid phase is not continuously circulating in a downward manner through the cellulosic biomass solids. Non-continuous conveyance and release of the phenolics liquid phase may be performed, for example, to accommodate the amount of phenolics liquid phase that is present, the rate of downward percolation through the cellulosic biomass solids, the need for a particular degree of slurry catalyst distribution in the cellulosic biomass solids, or any combination thereof.

In some embodiments, in addition to the downward motion of the phenolics liquid phase containing the slurry catalyst, upwardly directed fluid flow may also be present. That is, in some embodiments, the slurry catalyst may be distributed in the cellulosic biomass solids using both downward motion of the phenolics liquid phase and upwardly directed fluid flow. In some embodiments, the upwardly directed fluid flow may be used to circulate at least a portion of the slurry catalyst through the cellulosic biomass solids. In other embodiments, the upwardly directed fluid flow may not be sufficient to completely convey the slurry catalyst through the cellulosic biomass solids (i.e., to circulate the slurry catalyst). In such cases, the methods described herein may be particularly advantageous, since they may promote catalyst distribution into portions of the cellulosic biomass solids that are otherwise unreachable by circulating the slurry catalyst using upwardly directed fluid flow alone.

In some embodiments, the methods described herein may further comprise supplying upwardly directed fluid flow through the cellulosic biomass solids. In various embodiments, the upwardly directed fluid flow may comprise a gas stream, a liquid stream, or any combination thereof. In various embodiments, the upwardly directed fluid flow may comprise a stream of the aqueous phase, the phenolics liquid phase, or any combination thereof. In such embodiments, the upwardly directed fluid stream may contain the slurry catalyst. In other embodiments, the upwardly directed fluid stream may derive from a source that does not itself contain the slurry catalyst, such as an introduced liquid or gas stream that does not contain the slurry catalyst.

Even when an upwardly directed fluid stream derives from a source that does not itself contain the slurry catalyst, the upwardly directed fluid stream may still promote distribution of the slurry catalyst in the cellulosic biomass solids. In some embodiments, the upwardly directed fluid stream may pass through the phenolics liquid phase, such that the upwardly directed fluid stream carries at least a portion of the slurry catalyst therewith. That is, in such embodiments, the upwardly directed fluid flow may fluidize at least a portion of the slurry catalyst through shear mixing and the like. In some or other embodiments, the upwardly directed fluid flow may slow the downward percolation of the slurry catalyst through the cellulosic biomass solids. Upwardly directed fluid streams that themselves contain the slurry catalyst may, in a similar manner, promote distribution of the slurry catalyst in the cellulosic biomass solids by fluidizing at least a portion of the slurry catalyst or by slowing the downward percolation of the slurry catalyst through the cellulosic biomass solids.

In various embodiments, the upwardly directed fluid flow may comprise one or more upwardly directed fluid streams. In various embodiments, the one or more upwardly directed fluid streams may pass through the cellulosic biomass solids, carrying the slurry catalyst thereto, and the one or more upwardly directed fluid streams may subsequently exit the hydrothermal digestion unit. In some embodiments, the upwardly directed fluid flow may comprise one upwardly directed fluid stream. In some embodiments, the upwardly directed fluid flow may comprise two upwardly directed fluid streams, or three upwardly directed fluid streams, or four upwardly directed fluid streams, or five upwardly directed fluid streams. In some embodiments, the one or more upwardly directed fluid streams may comprise a gas stream, a liquid stream, or any combination thereof.

In some embodiments, the one or more upwardly directed fluid streams may comprise a gas stream. For example, in some embodiments, a gas stream being used for upwardly directed fluid flow may comprise a stream of molecular hydrogen. In some or other embodiments, steam, compressed air, or an inert gas such as nitrogen, for example, may be used in place of or in addition to a stream of molecular hydrogen. Up to about 40% steam may be present in the fluid stream in various embodiments. An upwardly directed gas stream may be used to distribute the slurry catalyst within the cellulosic biomass solids when it is desired to maintain the slurry catalyst within the hydrothermal digestion unit and/or when a liquid stream alone is insufficient to distribute the slurry catalyst, for example. Specifically, when it is desired to maintain the slurry catalyst within the hydrothermal digestion unit, a gas stream may convey the slurry catalyst within the cellulosic biomass solids and then exit the hydrothermal digestion unit, while leaving the slurry catalyst behind at or below the liquid level in the hydrothermal digestion unit.

In some embodiments, the one or more upwardly directed fluid streams may comprise a liquid stream. An upwardly directed liquid stream may be used to distribute the slurry catalyst within the cellulosic biomass solids when it is not necessarily desired to maintain the slurry catalyst within the cellulosic biomass solids and/or a gas stream alone is insufficient to distribute the slurry catalyst, for example. Unlike a gas stream, described above, a liquid stream may, in some embodiments, convey the slurry catalyst through the cellulosic biomass solids, and eventually spill over when exiting the hydrothermal digestion unit. In other embodiments, slurry catalyst fluidization may be incomplete, and a liquid stream may still not completely convey the slurry catalyst through the cellulosic biomass solids before the liquid spills over.

In some embodiments, at least a portion of the aqueous phase containing the alcoholic component may be circulated through the cellulosic biomass solids, as described above. In some or other embodiments, at least a portion of the aqueous phase containing the alcoholic component may be withdrawn from the cellulosic biomass solids for subsequent processing. When processing the alcoholic component in the aqueous phase, the light organics phase may be processed at the same time, or the light organics phase can be processed separately. In some embodiments, subsequent processing of the aqueous phase may comprise conducting a second catalytic reduction reaction, if needed, for example, to increase the amount of soluble carbohydrates that are converted into the alcoholic component or to further reduce the degree of oxygenation of the alcoholic components that are formed. In some or other embodiments, the alcoholic component present in the aqueous phase may be further reformed without further transforming the alcoholic component through an intervening second catalytic reduction reaction. In some embodiments, the alcoholic component may be further reformed through any combination and sequence of further hydrogenolysis reactions and/or hydrogenation reactions, condensation reactions, isomerization reactions, oligomerization reactions, hydrotreating reactions, alkylation reactions, and the like. In some embodiments, an initial operation of downstream reforming may comprise a condensation reaction, often conducted in the presence of a condensation catalyst, in which the alcoholic component or a product formed therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow.

In some embodiments, after the aqueous phase is withdrawn from the cellulosic biomass solids, the alcoholic component therein may be at least partially separated from the aqueous phase. In some embodiments, the alcoholic component separated from the aqueous phase may be subjected to the downstream reforming reactions noted above, particularly a condensation reaction. That is, in some embodiments, the alcoholic component may be at least partially dried before conducting downstream reforming reactions. At least partial drying of the alcoholic component may be particularly beneficial to prolong the condensation catalyst's life. However, it is to be recognized that in alternative embodiments, the alcoholic component of the aqueous phase may be further reformed by subjecting the aqueous phase to a condensation catalyst directly or by removing only a portion of the water therefrom.

As used herein, the terms "dry," "dried," "drying," and other variants thereof refer to removal at least a portion of the water present in an aqueous phase. Likewise, the term "dried alcoholic component" refers to a liquid phase containing an alcohol that has had a least a portion of the water removed therefrom. It is to be recognized that a dried alcoholic component need not necessarily be completely anhydrous when dried, simply that its water content be reduced (e.g., less than 50 wt. % water). Even some decrease in the amount of water present can beneficially increase the lifetime of the condensation catalyst. In some embodiments, the dried alcoholic component may comprise about 40 wt. % or less water. In some or other embodiments, the dried alcoholic component may comprise about 35 wt. % or less water, or about 30 wt. % or less water, or about 25 wt. % or less water, or about 20 wt. % or less water, or about 15 wt. % or less water, or about 10 wt. % or less water, or about 5 wt. % or less water. In some embodiments of the methods described herein, a substantially anhydrous alcoholic component may be produced upon drying the reaction product. As used herein, a substance will be considered to be substantially anhydrous if it contains about 5 wt. % water or less.

In some or other embodiments, at least a portion of the alcoholic component may be separated from the aqueous phase, and the separated alcoholic component may be returned to the cellulosic biomass solids. Return of a separated alcoholic component to the cellulosic biomass solids may be used to reduce the water content of the digestion solvent, if desired. When a separated alcoholic component is returned to the cellulosic biomass solids, a stream of the alcoholic component may promote distribution of the cellulosic biomass solids in a like manner to that described above. Additional advantages of returning a portion of the alcoholic component to the cellulosic biomass solids may include promoting solubility of soluble carbohydrates and alcoholic components produced therefrom and for removing deposits from the slurry catalyst mediating the stabilization of soluble carbohydrates.

In various embodiments, the digestion solvent in which soluble carbohydrates are formed from cellulosic biomass solids and subsequently converted into the alcoholic component may comprise an organic solvent. In various embodiments, the digestion solvent may comprise an organic solvent and water. Although any organic solvent that is at least partially miscible with water may be used in the digestion solvent, particularly advantageous organic solvents are those that can be directly converted into fuel blends and other materials without being separated from the alcoholic component. That is, particularly advantageous organic solvents are those that may be co-processed during downstream reforming reactions with the alcoholic component being produced. Suitable organic solvents in this regard may include, for example, ethanol, ethylene glycol, propylene glycol, glycerol, and any combination thereof.

Even more desirably, in some embodiments, the organic solvent may comprise a glycol or be transformable to a glycol under the conditions used for stabilizing soluble carbohydrates. In some embodiments, the digestion solvent may comprise water and glycerol. Glycerol may be a particularly advantageous organic solvent in this regard, since it comprises a good solvent for soluble carbohydrates and readily undergoes a catalytic reduction reaction to form a glycol in the presence of molecular hydrogen and a suitable catalyst. In addition, glycerol is inexpensive and is readily available from natural sources. Thus, in some embodiments, the methods described herein may comprise co-processing a glycol formed from an organic solvent, particularly glycerol, in conjunction with a glycol formed from soluble carbohydrates.

In some embodiments, the digestion solvent may further comprise a small amount of a monohydric alcohol. The presence of at least some monohydric alcohols in the digestion solvent may desirably enhance the hydrothermal digestion and/or the catalytic reduction reactions being conducted therein. For example, inclusion of about 1% to about 5% by weight monohydric alcohols in the digestion solvent may desirably maintain catalyst activity due to a surface cleaning effect. At higher concentrations of monohydric alcohols, bulk solvent effects may begin to predominate. In some embodiments, the digestion solvent may comprise about 10 wt. % or less monohydric alcohols, with the balance of the digestion solvent comprising water and another organic solvent. In some embodiments, the digestion solvent may comprise about 5 wt. % or less monohydric alcohols, or about 4% or less monohydric alcohols, or about 3% or less monohydric alcohols, or about 2% of less monohydric alcohols, or about 1% or less monohydric alcohols. Monohydric alcohols present in the digestion solvent may arise from any source. In some embodiments, the monohydric alcohols may be formed as a co-product with the alcoholic component being formed by the catalytic reduction reaction. In some or other embodiments, the monohydric alcohols may be formed by a subsequent catalytic reduction of the initially produced alcoholic component and thereafter returned to the cellulosic biomass solids. In still other embodiments, the monohydric alcohols may be sourced from an external feed that is in flow communication with the cellulosic biomass solids.

In some embodiments, the digestion solvent may comprise between about 1% water and about 99% water, with the organic solvent comprising the balance of the digestion solvent composition. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the digestion solvent may comprise about 90% or less water by weight. In other embodiments, the digestion solvent may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

As the phenolics liquid phase forms, its viscosity may eventually become so great that it becomes difficult to transfer or otherwise process. Accordingly, in some embodiments, the methods described herein may further comprise reducing the viscosity of the phenolics liquid phase. In some embodiments, reducing the viscosity of the phenolics liquid phase may comprise adding an organic solvent to the phenolics liquid phase, where the organic solvent serves as a diluent and promotes dissolution of the lignin therein. In some or other embodiments, reducing the viscosity of the phenolics liquid phase may comprise at least partially depolymerizing the lignin in the phenolics liquid phase. At least partial depolymerization of the lignin may, in some embodiments, take place by hydrolyzing the lignin. In some or other embodiments, the lignin may be at least partially depolymerized by a hydrotreating reaction. That is, in some embodiments, the lignin may be at least partially depolymerized by heating the lignin in the presence of molecular hydrogen and a slurry catalyst capable of activating the molecular hydrogen. As used herein, the phrases "at least partially depolymerize" and "depolymerize at least a portion of" and grammatical equivalents thereof will be used synonymously with one another.

In some embodiments, heating to at least partially depolymerize the lignin (e.g., during hydrotreating) may take place at a temperature that is higher than that used to form soluble carbohydrates from the cellulosic biomass solids. In some embodiments, heating of the lignin to at least partially depolymerize it may comprise heating the phenolics liquid phase to a temperature of at least about 250° C. in the presence of molecular hydrogen and a catalyst capable of activating molecular hydrogen. The slurry catalyst can be the slurry catalyst already accumulated in the phenolics liquid phase. In some embodiments, heating of the lignin to at least partially depolymerize it may take place at a temperature of at least about 270° C., or at least about 275° C., or at least about 280° C., or at least about 285° C., or at least about 290° C., or at least about 295° C., or at least about 300° C. In some embodiments, heating of the lignin to at least partially depolymerize it may take place at a temperature ranging between about 250° C. and about 330° C., or between about 260° C. and about 320° C., or between about 270° C. and about 300° C., or between about 250° C. and about 290° C., or between about 270° C. and about 290° C. Heating to at least partially depolymerize the lignin may take place in the hydrothermal digestion unit in which the alcoholic component is being produced, or depolymerization may take place in a separate location.

In some embodiments, the temperatures used to produce soluble carbohydrates and transform the soluble carbohydrates into the alcoholic component may be insufficient to at least partially depolymerize lignin by thermal depolymerization. In some embodiments, the cellulosic biomass solids may be heated to a first temperature to form the phenolics liquid phase and the aqueous phase and to a second temperature to at least partially depolymerize the lignin, where the first temperature is lower than the second temperature and is insufficient to at least partially depolymerize the lignin. For example, in some embodiments, the phenolics liquid phase and the aqueous phase may be formed at a temperature of about 250° C. or less, and the lignin may be at least partially depolymerized at a temperature of about 270° C. or more.

The lignin within the phenolics liquid phase need not be completely depolymerized to achieve a beneficial reduction in viscosity. In some embodiments, the viscosity of the phenolics liquid phase may be reduced by at most about 20% by at least partially depolymerizing the lignin. In some or other embodiments, the viscosity of the phenolics liquid phase may be reduced by at most about 15%, or by at most about 10%, or by at most about 5% by at least partially depolymerizing the lignin.

In some embodiments, the phenolics liquid phase may be at least partially separated from the aqueous phase. As described above, in some embodiments, at least a portion of the phenolics liquid phase may be conveyed to a location above at least a portion of the cellulosic biomass solids and released such that the phenolics liquid phase and the slurry catalyst therein contact the cellulosic biomass solids and move downward therethrough. The phenolics liquid phase conveyed to a location above the cellulosic biomass solids may or may not be mixed with the aqueous phase. In some or other embodiments, a portion of the phenolics liquid phase may be removed from the cellulosic biomass solids so that quantities of the phenolics liquid phase do not become excessive (e.g., so that the phenolics liquid phase does not totally displace the digestion solvent in which the digestion of cellulosic biomass solids is being conducted). In some embodiments, the lignin within the phenolics liquid phase may be at least partially depolymerized before separating the phenolics liquid phase from the aqueous phase. In some or other embodiments, the lignin within the phenolics liquid phase may be at least partially depolymerized after or while separating the phenolics liquid phase from the aqueous phase.

In some embodiments, the reaction products resulting from lignin depolymerization (e.g., phenolic compounds) may be further processed. The reaction products resulting from lignin depolymerization may be processed separately from the alcoholic component derived from the cellulosic biomass solids, or the reaction products resulting from lignin depolymerization may be combined with the alcoholic component and further reformed to make different fuel blends than can be obtained through further reforming of the alcoholic component alone.

Whereas the slurry catalyst is desirably contained in the phenolics liquid phase being conveyed to a location above at least a portion of the cellulosic biomass solids, it may be desirable to remove the slurry catalyst from the phenolics liquid phase that is being further processed. In some embodiments, the slurry catalyst may be separated from the phenolics liquid phase after the lignin therein is at least partially depolymerized. Viscosity reduction through lignin depolymerization may facilitate slurry catalyst removal from the phenolics liquid phase, such as, for example, by filtration, gravity-induced settling, centrifugation, and the like. Slurry catalyst separated from the phenolics liquid phase may then be returned to the cellulosic biomass solids for redistribution therein. Optionally, the slurry catalyst may be regenerated before being returned to the cellulosic biomass solids or while being returned to the cellulosic biomass solids. In some embodiments, the slurry catalyst may be carried by a stream of the digestion solvent, a recycle flow of the aqueous phase, or any combination thereof to return the slurry catalyst to the cellulosic biomass solids.

In some instances it may be desirable to conduct one or more further catalytic reduction reactions on the aqueous phase. For example, in some embodiments, it may be desirable to perform a second catalytic reduction reaction on the aqueous phase external to the hydrothermal digestion unit in which it was formed. In various embodiments, performing a second catalytic reduction reaction on the aqueous phase may comprise increasing a quantity of the alcoholic component, increasing the amount of soluble carbohydrates that are transformed, and/or further decreasing the degree of oxygenation of the alcoholic component. Choice of whether to perform a second catalytic reduction reaction may be made, for example, based upon whether sufficient quantities of the alcoholic component have been formed and/or if further stabilization of soluble carbohydrates is desired. In some embodiments, glycols formed by an in situ catalytic reduction reaction process may be transformed into monohydric alcohols by performing a second catalytic reduction reaction. In some embodiments, the monohydric alcohols may comprise a feed for further reforming reactions.

In some embodiments, the catalyst used for mediating a second catalytic reduction reaction may be the same catalyst used for mediating the first catalytic reduction reaction. In other embodiments, the catalyst used for mediating the second catalytic reduction reaction may be different than that used for mediating the first catalytic reduction reaction. For example, in some embodiments, a slurry catalyst may be used to mediate the first catalytic reduction reaction, and a fixed bed catalyst may be used to mediate the second catalytic reduction reaction. In other embodiments, a poison-tolerant catalyst may be used to mediate the first catalytic reduction reaction, and a non-poison-tolerant catalyst may be used to mediate the second catalytic reduction reaction, particularly if catalyst poisons can be removed from the liquor phase before performing the second catalytic reduction reaction. In still other embodiments, a first poison-tolerant catalyst may be used to mediate the first catalytic reduction reaction, and a second poison-tolerant catalyst may be used to mediate the second catalytic reduction reaction. For example, in some embodiments, a poison-tolerant slurry catalyst may be used to mediate the first catalytic reduction reaction, and a fixed bed poison-tolerant catalyst may be used to mediate the second catalytic reduction reaction.

In some embodiments, the alcoholic component produced by the methods described hereinabove may be subjected to additional reforming reactions. In addition, the light organics phase may also be subjected to the additional reforming reactions, either separately or combined with the alcoholic component. The reforming reactions may be catalytic or non-catalytic. Such additional reforming reactions may comprise any combination of further catalytic reduction reactions (e.g., hydrogenation reactions, hydrogenolysis reactions, hydrotreating reactions, and the like), condensation reactions, isomerization reactions, desulfurization reactions, dehydration reactions, oligomerization reactions, alkylation reactions, and the like.

In some embodiments, the first operation of further reforming the alcoholic component may comprise a condensation reaction. Ordinarily, alcohols do not directly undergo condensation reactions, although they are not expressly precluded from doing so. Instead, in order to undergo a condensation reaction, an alcohol is usually converted into a carbonyl compound or a compound that may subsequently react to form a carbonyl compound. The transformation to form the carbonyl compound may take place in concert with the condensation reaction or occur in a discrete conversion prior to the condensation reaction. Suitable transformations for converting alcohols into carbonyl compounds or compounds that may be transformed into carbonyl compounds include, for example, dehydrogenation reactions, dehydration reactions, oxidation reactions, or any combination thereof. When the carbonyl compound is formed catalytically, the same catalyst or a different catalyst than that used to carry out the condensation reaction may be used.

Although a number of different types of catalysts may be used for mediating condensation reactions, zeolite catalysts may be particularly advantageous in this regard. One zeolite catalyst that may be particularly well suited for mediating condensation reactions of alcohols is ZSM-5 (Zeolite Socony Mobil 5), a pentasil aluminosilicate zeolite having a composition of $Na_nAl_nSi_{96-n}O_{192} \cdot 16H_2O$ (0<n<27), which may transform an alcohol feed into a condensation product. Without being bound by any theory or mechanism, it is believed that this catalyst may promote condensation of alcohols in a concerted manner by mediating a dehydrogenation reaction to produce a carbonyl compound which subsequently undergoes the desired condensation reaction. Other suitable zeolite catalysts may include, for example, ZSM-12, ZSM-22, ZSM-23, SAPO-11, and SAPO-41. Additional types of suitable condensation catalysts are also discussed in more detail herein.

In some embodiments, prior to performing a condensation reaction, a slurry catalyst used in conjunction with mediating a first and/or second catalytic reduction reaction may be removed from the alcoholic component. Suitable techniques for removing a slurry catalyst from the alcoholic component may include, for example, filtration, membrane separation, separation by centrifugal or centripetal force (e.g., hydroclones and centrifuges), gravity-induced settling, and the like. In some embodiments, slurry catalyst may remain as a bottoms residue when distillation is used to separate the alcoholic component from the aqueous phase. Sulfided catalysts may be particularly advantageous in this regard, since they may experience minimal loss in their catalytic activity when present in an aqueous phase that is being distilled. Regardless of how separated, the slurry catalyst may subsequently be returned to the cellulosic biomass solids, if desired. If needed, the slurry catalyst may be regenerated before or while being returned to the cellulosic biomass solids.

In various embodiments, the condensation reaction may take place at a temperature ranging between about 5° C. and about 500° C. The condensation reaction may take place in a condensed phase (e.g., a liquor phase) or in a vapor phase. For condensation reactions taking place in a vapor phase, the temperature may range between about 75° C. and about 500° C., or between about 125° C. and about 450° C. For condensation reactions taking place in a condensed phase, the temperature may range between about 5° C. and about 475° C., or between about 15° C. and about 300° C., or between about 20° C. and about 250° C.

In various embodiments, the higher molecular weight compound produced by the condensation reaction may comprise $\geq C_4$ hydrocarbons. In some or other embodiments, the higher molecular weight compound produced by the condensation reaction may comprise $\geq C_6$ hydrocarbons In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure. For example, in some embodiments, the product of the condensation reaction may comprise $\geq C_4$ alcohols and/or ketones that are produced concurrently with or in lieu of $\geq C_4$ hydrocarbons. In some embodiments, the $\geq C_4$ hydrocarbons produced by the condensation reaction may contain various olefins in addition to alkanes of various sizes, typically branched alkanes. In still other embodiments, the $\geq C_4$ hydrocarbons produced by the condensation reaction may also comprise cyclic hydrocarbons and/or aromatic compounds. In some embodiments, the higher molecular weight compound produced by the condensation reaction may be further subjected to a catalytic reduction reaction to transform a carbonyl functionality therein to an alcohol and/or a hydrocarbon and to convert olefins into alkanes.

Exemplary compounds that may be produced by a condensation reaction include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes that may be produced by the condensation reaction include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethylhexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_1$ alkylene, a straight chain $\geq C_2$ alkylene, an aryl group, or a combination thereof. In some embodiments, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet other embodiments, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of $\geq C_5$ cycloalkanes and $\geq C_5$ cycloalkenes that may be produced by the condensation reaction include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

The moderate fractions of the condensation reaction, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The $\geq C_4$ compounds may also find use as industrial chemicals, whether as an intermediate or an end product. For example, the aryl compounds toluene, xylene, ethylbenzene, para-xylene, meta-xylene, and ortho-xylene may find use as chemical intermediates for the production of plastics and other products. Meanwhile, $C_9$ aromatic compounds and fused aryl compounds, such as naphthalene, anthracene, tetrahydronaphthalene, and decahydronaphthalene, may find use as solvents or additives in industrial processes.

In some embodiments, a single catalyst may mediate the transformation of the alcoholic component into a form suitable for undergoing a condensation reaction as well as mediating the condensation reaction itself. In other embodiments, a first catalyst may be used to mediate the transformation of the alcoholic component into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of the alcoholic component, followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of the alcoholic component, and the second catalyst may mediate a condensation reaction of the dehydrogenated alcoholic component. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst. Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in a fluid.

In accordance with the description provided above, in some embodiments, the present disclosure provides biomass conversion systems that may be used for processing cellulosic biomass solids. In some embodiments, the biomass conversion systems may comprise: a hydrothermal digestion unit; a first fluid conduit configured to remove a first fluid from an upper portion of the hydrothermal digestion unit and return the first fluid to a lower portion of the hydrothermal digestion unit; and a second fluid conduit configured to remove a second fluid from a lower portion of the hydrothermal digestion unit and return the second fluid to an upper portion of the hydrothermal digestion unit. Using the biomass conversion systems set forth in the foregoing description, a first fluid (e.g., an aqueous phase, a phenolics liquid phase, or any combination thereof) may be upwardly circulated through the hydrothermal digestion unit using the first fluid conduit. At the same time, a second fluid (e.g., the phenolics liquid phase) may be conveyed from a lower portion of the hydrothermal digestion unit to an upper portion of the hydrothermal digestion unit such that a slurry catalyst may also progress downward through the hydrothermal digestion unit.

In some embodiments, the biomass conversion systems may further comprise a solids introduction mechanism coupled to the top of the hydrothermal digestion unit. Suitable solids introduction mechanisms have been described in more detail hereinabove. In some embodiments, the solids introduction mechanism may be configured to introduce cellulosic biomass solids to the hydrothermal digestion unit while the hydrothermal digestion unit maintains a pressurized state. Moreover, in some embodiments, an exit of the second fluid conduit may be operably connected to a flow dispersal system in the upper portion of the hydrothermal digestion unit. Again, suitable flow dispersal systems have been described in more detail hereinabove.

In some embodiments, the hydrothermal digestion unit may be fluidly connected to one or more additional reactors, such that an alcoholic component being produced therein can be further reformed through one or more additional reforming reactions.

The biomass conversion systems and methods described herein will now be described with further reference to the drawings. When an element performs a like function in two or more figures, the same reference character will be used at each occurrence, and the element will only be described in detail a single time.

Figure 2:
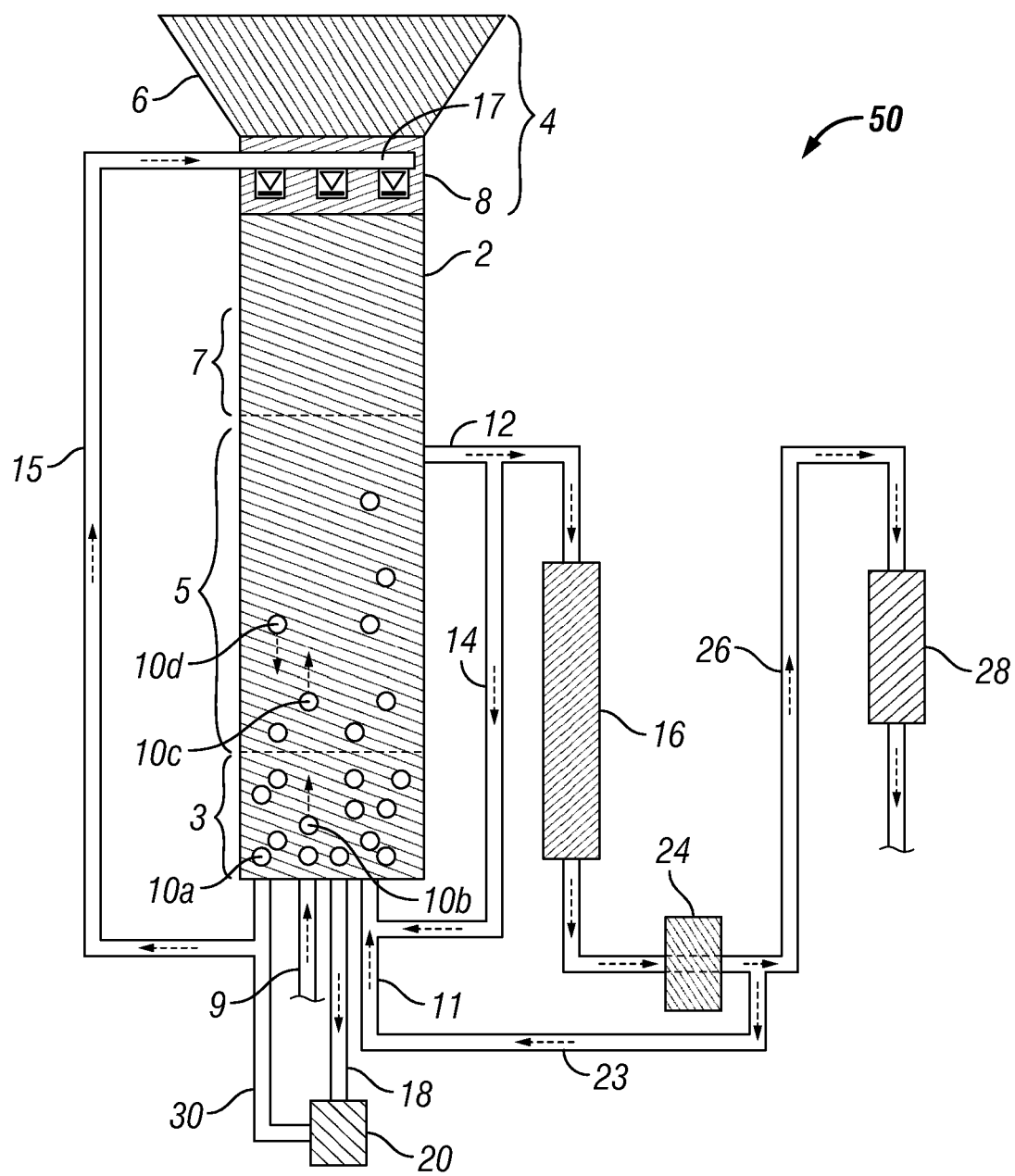
Figure 3:
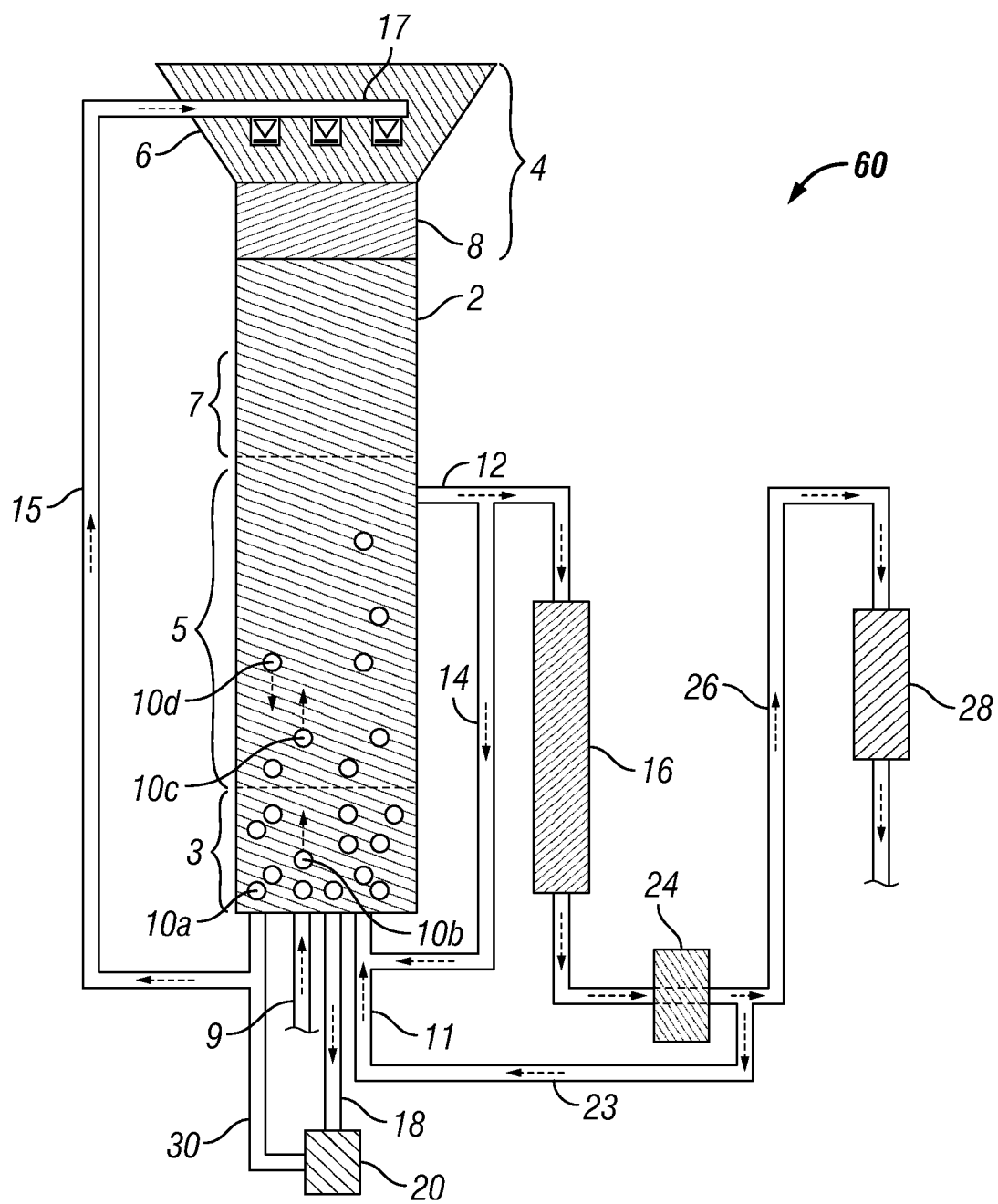

FIGS. 1-3 show schematics of illustrative biomass conversion systems 1, 50, and 60 in which a phenolics liquid phase containing a slurry catalyst may be used to promote catalyst distribution in cellulosic biomass solids. As depicted in the FIGURES, cellulosic biomass solids may be introduced to hydrothermal digestion unit 2 via solids introduction mechanism 4. Solids introduction mechanism 4 may comprise loading mechanism 6 and pressure transition zone 8, which may elevate the cellulosic biomass solids from atmospheric pressure to a pressure near that of the operating pressure of hydrothermal digestion unit 2, thereby allowing continuous or semi-continuous introduction of cellulosic biomass solids to take place without fully depressurizing hydrothermal digestion unit 2. Suitable loading mechanisms and pressure transition zones have been described in more detail hereinabove.

Hydrothermal digestion unit 2 contains cellulosic biomass solids, a digestion solvent, and particulates of the slurry catalyst 10a-10e. In the interest of clarity, the cellulosic biomass solids have not been depicted in the FIGURES, but it is to be understood that at least a portion of the slurry catalyst particulates are distributed within the cellulosic biomass solids. Upon digestion of the cellulosic biomass solids in the presence of the digestion solvent, the slurry catalyst, and molecular hydrogen, phase separation occurs. Typically, a phenolics liquid phase occurs in zone 3 of hydrothermal digestion unit 2, and an aqueous phase containing an alcoholic component derived from the cellulosic biomass solids occurs in zone 5 of hydrothermal digestion unit 2. Depending on process conditions, a light organics phase may also occur in zone 7 of hydrothermal digestion unit 2.

Before digestion of the cellulosic biomass solids begins, the slurry catalyst is distributed in the cellulosic biomass solids using fluid flow. After phase separation occurs, individual particulates of the slurry catalyst may be located at different points within hydrothermal digestion unit 2 and have different relative motion therein. As described above, some slurry catalyst particulates 10a and 10b may accumulate in phenolics liquid phase within zone 3. Some of these slurry catalyst particulates may be fluidized by upwardly directed fluid flow supplied by gas inlet line 9 or fluid return line 11. For example, as depicted in FIG. 1, slurry catalyst particulate 10b has been fluidized and is moving upward within the phenolics liquid phase. Slurry catalyst particulates 10c and 10d are located within the aqueous phase in zone 5 of hydrothermal digestion unit 2. Slurry catalyst particulate 10c is moving upward under the influence of upwardly directed fluid flow from gas inlet line 9 and/or fluid return line 11. Slurry catalyst particulate 10c may originate from the phenolics liquid phase before entering the aqueous phase, or it may originally be migrating downward in the aqueous phase before being upwardly conveyed by the upwardly directed fluid flow. In contrast, slurry catalyst particulate 10d is moving downward within the aqueous phase under the influence of gravity before eventually accumulating in the phenolics liquid phase. As described hereinabove, upwardly directed fluid flow from gas inlet line 9 and/or fluid return line 11 may also slow downward motion of the slurry catalyst particulates (e.g., slurry catalyst particulate 10d) in zone 5 such that they accumulate less rapidly in the phenolics liquid phase.

As described herein, when upwardly directed fluid flow alone is insufficient to produce a desired degree of slurry catalyst distribution in the cellulosic biomass solids, the slurry catalyst accumulated in the phenolics liquid phase may be redistributed by conveying the phenolics liquid phase to a location above at least a portion of the cellulosic biomass solids and releasing the phenolics liquid phase so that the slurry catalyst therein progresses downward through the cellulosic biomass solids. Referring again to the FIGURES, at least a portion of the phenolics liquid phase in zone 3 of hydrothermal digestion unit 2 may be transferred via fluid conduit 15 to zone 7 of hydrothermal digestion unit 2. Although FIG. 1 has depicted fluid conduit 15 as entering in zone 7 of hydrothermal digestion unit 2, it is to be recognized that fluid conduit 15 may enter at any point above the level of level of the phenolics liquid phase, as described in more detail hereinabove. Further, fluid conduit 15 may enter hydrothermal digestion unit 2 at multiple points if desired. Moreover, in alternative configurations, fluid conduit 15 may convey the phenolics liquid phase to locations other than within hydrothermal digestion unit 2. As depicted in FIG. 2, for example, fluid conduit 15 may convey the phenolics liquid phase to pressure transition zone 8, or as depicted in FIG. 3, for example, fluid conduit 15 may convey the phenolics liquid phase to loading mechanism 6. In the embodiments depicted in FIGS. 2 and 3, the phenolics liquid phase may adhere to the cellulosic biomass solids and progress downward within hydrothermal digestion unit 2 as the cellulosic biomass solids are introduced thereto and digested therein.

Optionally, the exit of fluid conduit 15 may be connected to flow dispersal system 17, which may promote the formation of droplets 13 of phenolics liquid phase containing slurry catalyst particulate 10e therein. As droplets 13 and slurry catalyst particulate 10e progress downward, the slurry catalyst can become re-distributed in the cellulosic biomass solids to promote the stabilization of soluble carbohydrates produced during hydrothermal digestion. Again, in alternative configurations, the phenolics liquid phase can become adhered to the cellulosic biomass solids to accomplish slurry catalyst distribution in a related manner. It is to be recognized that even if flow dispersal system 17 is not present, slurry catalyst particulate 10e may progress downward in a like manner.

If needed, the phenolics liquid phase may be withdrawn from hydrothermal digestion unit 2 via lignin removal line 18, which is operably connected to lignin processing unit 20. For example, at least a portion of the phenolics liquid phase may be withdrawn and processed to keep the phenolics liquid phase at a desirable level in hydrothermal digestion unit 2, or to control the viscosity of the phenolics liquid phase. As described above, processing of the phenolics liquid phase may comprise at least partial depolymerization of the lignin, filtration to remove the slurry catalyst, or any combination thereof. Slurry catalyst separated from the phenolics liquid phase may thereafter be returned to hydrothermal digestion unit 2. Optionally, lignin processing unit 20 may be fluidly connected to fluid conduit 15 via line 30, for example, if it is desired to reduce the viscosity of the phenolics liquid phase prior to returning the phenolics liquid phase to the upper portions of hydrothermal digestion unit 2.

The alcoholic component in the aqueous phase may be withdrawn from hydrothermal digestion unit 2 via line 12. If desired, at least a portion of the aqueous phase may be recirculated to hydrothermal digestion unit 2 via recycle line 14 and fluid return line 11, thereby defining a fluid circulation loop. For example, circulation of the aqueous phase may circulate at least a portion of the slurry catalyst, reduce temperature gradients in hydrothermal digestion unit 2, and/or provide a source of upwardly directed fluid flow for fluidizing the slurry catalyst particulates or slowing their downward percolation.

Optionally, an additional catalytic reduction reaction may be conducted on the aqueous phase. As described above, the additional catalytic reduction reaction may reduce the degree of oxygenation present in the alcoholic component, further promote stabilization of soluble carbohydrates, or any combination thereof. Accordingly, polishing reactor 16, which contains a catalyst capable of activating molecular hydrogen, may be present. The catalyst present in polishing reactor 16 may be the same as or different than that present in hydrothermal digestion unit 2. In the event that polishing reactor 16 is omitted, the aqueous phase from line 12 may be directly fed forward for further processing, as described below.

Optionally, drying unit 24 may be present when processing the aqueous phase. Drying unit 24 may employ any suitable technique for at least partially removing water from the aqueous phase, thereby producing an alcoholic component that is at least partially dried. Suitable techniques for removing water from the aqueous phase may include, for example, contacting the aqueous phase with a drying agent, distillation to remove water, or any combination thereof. At least partial removal of water from the aqueous phase may be desirable to prolong the life of downstream catalysts that are sensitive to water (e.g., ZSM-5). Optionally, after being at least partially dried, at least a portion of the dried alcoholic component may be returned to hydrothermal digestion unit 2 via line 23.

After optionally having at least a portion of the water in the aqueous phase removed in drying unit 24, the alcoholic component may be transferred via line 26 to reforming reactor 28, where one or more further reforming reactions may take place. The reforming reaction taking place therein may be catalytic or non-catalytic. Although only one reforming reactor 28 has been depicted in the FIGURES, it is to be understood that any number of reforming reactors may be present. In some embodiments, a first reforming reaction may comprise a condensation reaction. Additional reforming reactions may comprise any combination of further catalytic reduction reactions (e.g., hydrogenation reactions, hydrogenolysis reactions, hydrotreating reactions, and the like), further condensation reactions, isomerization reactions, desulfurization reactions, dehydration reactions, oligomerization reactions, alkylation reactions, and the like. Such transformations may be used to convert the initially produced soluble carbohydrates into a biofuel. Such biofuels may include, for example, gasoline hydrocarbons, diesel fuels, jet fuels, and the like. As used herein, the term "gasoline hydrocarbons" refers to substances comprising predominantly $C_5$-$C_9$ hydrocarbons and having a boiling point of 32° C. to about 204° C. More generally, any fuel blend meeting the requirements of ASTM D2887 may be classified as a gasoline hydrocarbon. Suitable gasoline hydrocarbons may include, for example, straight run gasoline, naphtha, fluidized or thermally catalytically cracked gasoline, VB gasoline, and coker gasoline. As used herein, the term "diesel fuel" refers to substances comprising paraffinic hydrocarbons and having a boiling point ranging between about 187° C. and about 417° C., which is suitable for use in a compression ignition engine. More generally, any fuel blend meeting the requirements of ASTM D975 may also be defined as a diesel fuel. As used herein, the term "jet fuel" refers to substances meeting the requirements of ASTM D1655. In some embodiments, jet fuels may comprise a kerosene-type fuel having substantially $C_8$-$C_{16}$ hydrocarbons (Jet A and Jet A-1 fuels). In other embodiments, jet fuels may comprise a wide-cut or naphtha-type fuel having substantially $C_5$-$C_{15}$ hydrocarbons present therein (Jet B fuels).

To facilitate a better understanding of the present invention, the following examples of preferred embodiments are given. In no way should the following examples be read to limit, or to define, the scope of the invention.

EXAMPLES

Example 1

Formation of a Phenolics Liquid Phase

A 450 mL Parr reactor fitted with glass liner was charged with 190 grams of 50% glycerol in deionized water solvent. 0.62 grams of potassium carbonate was added as buffer, together with 2.44 grams of sulfided nickel oxide-promoted cobalt molybdate catalyst (DC-2534, Criterion Catalyst Technologies L.P., containing 1-10% cobalt oxide and molybdenum trioxide (up to 30 wt. %) on alumina, and less than 2% nickel). The catalyst was previously sulfided as described in United States Patent Application Publication 2010/0236988, which is incorporated herein by reference in its entirety. The reactor was then charged with 19.5 grams of southern pine mini-chips (39% moisture) having a nominal size of 3 mm×4 mm×5 mm and pressurized with 765 psia of hydrogen. The stirred reactor was heated to 190° C. for 1 hour before ramping over 15 minutes to a temperature of 250° C. for 2 hours, followed by a ramp to 270° C. to complete a 5 hour total cycle for digestion and reaction. Dissolution and conversion of the wood chips to soluble components was essentially complete, upon cooling, depressurizing, and opening the reactor for subsequent reaction cycles.

Three additional cycles of wood chip and buffer addition were conducted. Samples of the stirred reaction product were taken via a filtered dip tube at the final reactor temperature. By cycle 4, the reaction product in the reactor was turbid, with a second, opaque black phase coalescing and separating over the 3 cm height of the sample vial within 10 seconds of sampling. At the end of four cycles, the black, water-immiscible bottoms phase was sampled directly into an 8 dram vial from the reactor bowl. Solid catalyst was found to be present in this phase based upon the detection of cobalt and molybdenum via inductively coupled plasma atomic spectroscopy and visual observation of solids on the vial bottom. Cobalt and molybdenum were not detected in the aqueous phase sample, indicating virtually complete segregation of catalyst to the bottoms phase.

Example 2

Viscosity of the Phenolics Liquid Phase

The bottoms phase sample was reheated to 90° C. in a block heater, and its viscosity was measured by a falling film method. The measured viscosity was visually observed to be less than 1000 cP.

Example 3

Terminal Velocity of the Phenolics Liquid Phase Through a Static Column of Water An 8 dram vial of deionized water with 2% acetone was heated to 92° C. in a block heater. The phenolics liquid phase from Example 1 was also heated to 92° C., and a 4 mm droplet was placed into the heated water. The droplet fell immediately to the bottom of the vial at a velocity greater than 8 mm per second.

Example 4

Terminal Velocity of the Phenolics Liquid Phase Through a Static Column of Water and Wood Chips Example 3 was repeated, except the vial was also prefilled with pine mini-chips (39% moisture, having a nominal size of 3 mm×4 mm×5 mm). Several droplets of the phenolics liquid phase containing catalyst particles of 0.5 mm to 3 mm in size were then placed on top of the water-wetted bed of wood chips. The droplets disengaged and sunk from the liquid surface, but only one droplet was observed to fall entirely through the 4 cm tall wood chip bed to the bottom of the vial. The remainder of the droplets adhered to the wood chip surface, indicating preferential wetting of the wood chips.

Example 5

Terminal Velocity of the Phenolics Liquid Phase Through a Column of Water with Gas Sparging The experiment of Example 3 was repeated with $N_2$ gas being introduced at a flow rate corresponding to a gas velocity of 1 cm/sec using a 1/16 inch Teflon tube extending to the bottom of the vial. Sparging of $N_2$ at this velocity was insufficient to transport the droplet of the phenolics liquid phase to the top of the vial.

Examples 6 and 7

Origin of the Phenolics Liquid Phase

Two Parr5000 reactors were charged with 20 grams of 45% 1,2-propylene glycol/5% ethylene glycol in deionized water as solvent. 0.30 grams of the sulfided cobalt molybdate catalyst from Example 1 was added to each reactor, along with 0.12 grams of potassium carbonate buffer. For Example 6, 2.0 grams of powdered cellulose (Sigma-Aldrich, less than 2% moisture) was added for each cycle. For Example 7, 2.7 grams of ground southern pine chips (39% moisture) was added for each cycle. The reactors were pressured with 52 bar of hydrogen, and heated to 190° C. for 1 hour, followed by heating to 250° C. to complete a 5 hour reaction cycle. At the end of each cycle, the reactors were allowed to cool and phase separate overnight before sampling. A sample of the aqueous layer was collected via pipet each cycle, and an equivalent amount of cellulose or wood chips was added at the next cycle. In this manner, liquid level in the reactors could be maintained. The aqueous layers were clear and free of catalyst after settling overnight.

The reaction sequence was continued through 24 cycles, after which the reactor contents were poured into glass beakers to observe phase formation. There was only a small amount of water-miscible aqueous layer left in each reactor. The sample of Example 6 with cellulose-only addition separated into an upper, oil-rich layer with density less than the aqueous layer, and a clear, faintly yellow aqueous layer. No bottoms layer formed. The catalyst was dispersed in the upper oil-rich layer, and some was located at the bottom of the aqueous layer. The sample of Example 7 separated into an upper clear yellow aqueous layer containing no catalyst and a phenolics layer that was not water miscible. The phenolics layer was opaque black and contained the solid catalyst. GC mass spec analysis of a portion of the heavy bottoms layer dissolved in acetone indicated the presence of substituted phenols derived from lignin.

Examples 8 and 9

Yield Enhancement with Downward Percolation of Catalyst

Two 75 mL Parr5000 reactors were charged with 20 grams of deionized water solvent, 0.12 grams of potassium carbonate buffer, and 2.7 grams of southern pine mini-chips (39% moisture). For Example 8, 0.30 grams of the cobalt-molybdate catalyst was crushed and slurried with 5 grams of m-cresol solvent (density 1.034 relative to water). The m-cresol was not fully miscible with water. Thereafter, the m-cresol and catalyst were added to the top of the reactor contents. For Example 9, the same slurry was added to the bottom of the reactor before the addition of deionized water solvent and wood.

Both reactors were pressured to 52 bar with hydrogen and heated, unstirred, to 190° C. for 1 hour, followed by heating to 250° C. for 4 hours. Thereafter, both reactors were opened, and the contents were filtered via Whatman GF/F filter paper to assess the percentage of wood solids digested. For Example 8 (top addition of slurry catalyst), 100% of the wood chips were digested. For Example 9 (bottom addition of slurry catalyst), 91% of the wood chips were digested and the remaining 9% were undigested. GC analysis indicated 50% greater yields of glycols and mono-oxygenated compounds for Example 8 than for Example 9.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing cellulosic biomass solids in a digestion solvent;
heating the cellulosic biomass solids and the digestion solvent in the presence of molecular hydrogen and a slurry catalyst capable of activating molecular hydrogen, thereby forming a phenolics liquid phase comprising lignin, an aqueous phase comprising an alcoholic component derived from the cellulosic biomass solids, and an optional light organics phase, the slurry catalyst being distributed in the cellulosic biomass solids and at least a portion of the slurry catalyst accumulating in the phenolics liquid phase as it forms;
supplying upwardly directed fluid flow through the cellulosic biomass solids wherein at least a portion of the slurry catalyst is upwardly conveyed by the upwardly directed fluid flow into at least a portion of the cellulosic biomass solids;
conveying at least a portion of the phenolics liquid phase and the slurry catalyst therein to a location above at least a portion of the cellulosic biomass solids; and
after conveying the phenolics liquid phase and the slurry catalyst, releasing them such that they come in contact with the cellulosic biomass solids.

2. The method of claim 1, wherein the phenolics liquid phase and the slurry catalyst are conveyed external to the cellulosic biomass solids.

3. The method of claim 1, wherein the alcoholic component is formed by a catalytic reduction reaction of soluble carbohydrates, the soluble carbohydrates being derived from the cellulosic biomass solids.

4. The method of claim 3, wherein the alcoholic component comprises a monohydric alcohol, a glycol, a triol, or any combination thereof.

5. The method of claim 3, wherein the alcoholic component comprises a glycol.

6. The method of claim 1, wherein the upwardly directed fluid flow comprises a gas stream, a liquid stream, or any combination thereof.

7. The method of claim 1, wherein the upwardly directed fluid flow comprises a stream of the aqueous phase, the phenolics liquid phase, or any combination thereof.

8. The method of claim 1, wherein the upwardly directed fluid flow passes through the phenolics liquid phase.

9. The method of claim 1, further comprising:
at least partially depolymerizing the lignin in at least a portion of the phenolics liquid phase.

10. The method of claim 9, further comprising:
before or after at least partially depolymerizing the lignin, separating at least a portion of the phenolics liquid phase from the aqueous phase.

11. The method of claim 9, further comprising:
after at least partially depolymerizing the lignin, removing the slurry catalyst from the phenolics liquid phase.

12. The method of claim 1, further comprising:
separating at least a portion of the phenolics liquid phase from the aqueous phase.

13. The method of claim 1, wherein the slurry catalyst comprises a poison-tolerant catalyst.

14. The method of claim 13, wherein the poison-tolerant catalyst comprises a sulfided catalyst.

15. The method of claim 1, wherein after being released, the phenolics liquid phase and the slurry catalyst downwardly percolate through the cellulosic biomass solids.

16. The method of claim 15, wherein after being released, the phenolics liquid phase forms droplets containing the slurry catalyst that downwardly percolate through the cellulosic biomass solids.

17. The method of claim 1, wherein heating the cellulosic biomass solids and the digestion solvent in the presence of molecular hydrogen and the slurry catalyst takes place in a hydrothermal digestion unit, the hydrothermal digestion unit comprising a fluid conduit for conveying the phenolics liquid phase from a lower portion of the hydrothermal digestion unit to a location above at least a portion of the cellulosic biomass solids.

18. The method of claim 17, wherein the fluid conduit conveys the phenolics liquid phase to an upper portion of the hydrothermal digestion unit.

19. The method of claim 18, wherein an exit of the fluid conduit is operably connected to a flow dispersal system in the upper portion of the hydrothermal digestion unit.

20. The method of claim 17, wherein the fluid conduit conveys the phenolics liquid phase to a location above at least a portion of the cellulosic biomass solids at a location before the cellulosic biomass solids are introduced to the hydrothermal digestion unit.

21. The method of claim 1, wherein conveying and releasing at least a portion of the phenolics liquid phase and the slurry catalyst comprises circulating the phenolics liquid phase through the cellulosic biomass solids.

22. A method comprising:
providing cellulosic biomass solids in a digestion solvent;
heating the cellulosic biomass solids and the digestion solvent in the presence of molecular hydrogen and a slurry catalyst capable of activating molecular hydrogen, thereby forming a phenolics liquid phase comprising lignin, an aqueous phase comprising an alcoholic component derived from the cellulosic biomass solids, and an optional light organics phase, at least a portion of the slurry catalyst accumulating in the phenolics liquid phase as it forms;
supplying upwardly directed fluid flow through the cellulosic biomass solids wherein at least a portion of the slurry catalyst is upwardly conveyed by the upwardly directed fluid flow into at least a portion of the cellulosic biomass solids;
conveying at least a portion of the phenolics liquid phase and the slurry catalyst therein to a location above at least a portion of the cellulosic biomass solids; and
after conveying the phenolics liquid phase and the slurry catalyst, releasing them and downwardly percolating the phenolics liquid phase and the slurry catalyst through the cellulosic biomass solids.

23. The method of claim 22, wherein the phenolics liquid phase and the slurry catalyst are conveyed external to the cellulosic biomass solids.

24. The method of claim 22, wherein the alcoholic component is formed by a catalytic reduction reaction of soluble carbohydrates, the soluble carbohydrates being derived from the cellulosic biomass solids.

25. The method of claim 24, wherein the alcoholic component comprises a monohydric alcohol, a glycol, a triol, or any combination thereof.

26. The method of claim 24, wherein the alcoholic component comprises a glycol.

27. The method of claim 22, wherein the upwardly directed fluid flow comprises a gas stream, a liquid stream, or any combination thereof.

28. The method of claim 22, wherein the upwardly directed fluid flow passes through the phenolics liquid phase.

29. The method of claim 22, wherein the upwardly directed fluid flow comprises a stream of the aqueous phase, the phenolics liquid phase, or any combination thereof.

30. The method of claim 22, further comprising:
at least partially depolymerizing the lignin in at least a portion of the phenolics liquid phase.

31. The method of claim 30, further comprising:
before or after at least partially depolymerizing the lignin, separating at least a portion of the phenolics liquid phase from the aqueous phase.

32. The method of claim 30, further comprising:
after at least partially depolymerizing the lignin, removing the slurry catalyst from a portion of the phenolics liquid phase.

33. The method of claim 22, further comprising:
separating at least a portion of the phenolics liquid phase from the aqueous phase.

34. The method of claim 22, wherein the slurry catalyst comprises a poison-tolerant catalyst.

35. The method of claim 34, wherein the poison-tolerant catalyst comprises a sulfided catalyst.

36. The method of claim 22, wherein heating the cellulosic biomass solids and the digestion solvent in the presence of molecular hydrogen and the slurry catalyst takes place in a hydrothermal digestion unit, the hydrothermal digestion unit comprising a fluid conduit for conveying the phenolics liquid phase from a lower portion of the hydrothermal digestion unit to a location above at least a portion of the cellulosic biomass solids.

37. The method of claim 36, wherein the fluid conduit conveys the phenolics liquid phase to an upper portion of the hydrothermal digestion unit.

38. The method of claim 37, wherein an exit of the fluid conduit is operably connected to a flow dispersal system in the upper portion of the hydrothermal digestion unit.

* * * * *